United States Patent [19]

Yasuhiro

[11] Patent Number: 5,043,811
[45] Date of Patent: Aug. 27, 1991

[54] SCANNING LINE NUMBER CONVERTING DEVICE FOR VIDEO SIGNAL, AND DOWN-CONVERTER AND PICTURE-IN-PICTURE TV RECEIVER USING THE SAME

[75] Inventor: Yoshida Yasuhiro, Nara, Japan
[73] Assignee: Sharp Kabushiki Kaisha, Osaka, Japan
[21] Appl. No.: 536,723
[22] Filed: Jun. 12, 1990

[30] Foreign Application Priority Data
Jun. 15, 1989 [JP] Japan ................................. 1-152526
Jul. 29, 1989 [JP] Japan ................................. 1-197779
Oct. 11, 1989 [JP] Japan ................................. 1-264681

[51] Int. Cl.⁵ .............................................. H04N 7/01
[52] U.S. Cl. ..................................... 358/140; 358/11; 358/22; 358/183
[58] Field of Search ..................... 358/140, 183, 11, 22

[56] References Cited
U.S. PATENT DOCUMENTS

| 4,249,211 | 2/1981 | Baba ...................................... | 358/183 |
| 4,698,664 | 10/1987 | Nichols ................................ | 358/10 |
| 4,791,487 | 12/1988 | Kozuki ................................ | 358/140 |
| 4,870,489 | 9/1989 | Ducret .................................. | 358/11 |
| 4,987,489 | 1/1991 | Hurley ................................ | 358/140 |

Primary Examiner—Howard W. Britton
Attorney, Agent, or Firm—David G. Conlin

[57] ABSTRACT

In a scanning line number converting device, a video signal is converted into a digital signal, its scanning lines being thinned out by a thinning-out circuit (5) in the vertical direction to reduce the vertical direction sampling frequency and interpolated so as to form a non-interlace signal. The non-interlace signal is written in a frame memory (7), under control of a writing control circuit (8). A field determination circuit (15) determines a field of a video signal used as reference. According to this determination output, the non-interlace signal is read out of the frame memory while undergoing a conversion into an interlace signal such that its interlace sequence corresponds to that of the reference video signal, resulting in a conversion of the scanning line number. A down-converter for converting a high-resolution TV signal into an NTS signal is configured using this scanning line number converting device. Also, a picture-in-picture television is configures using the scanning line number converting device so as to thin out the scanning lines of a video signal of a sub-picture inserted into a main picture.

8 Claims, 23 Drawing Sheets

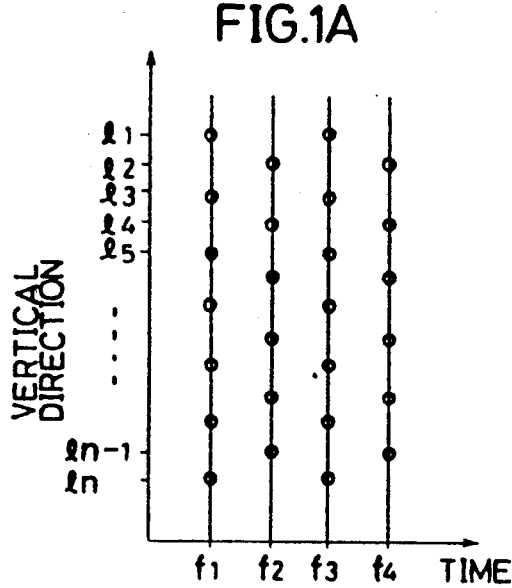
FIG.1A
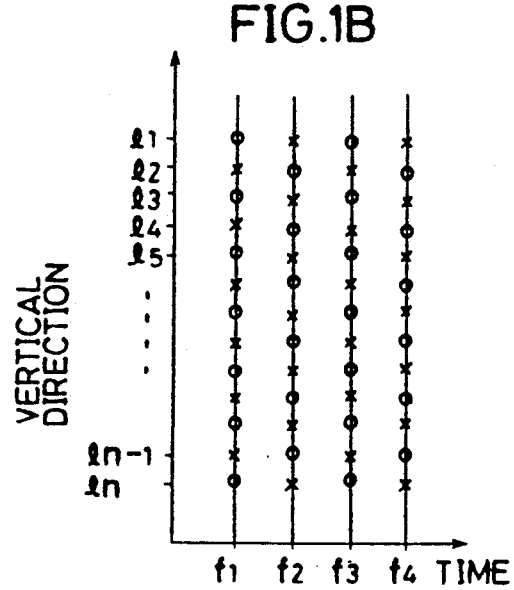
FIG.1B
FIG.2
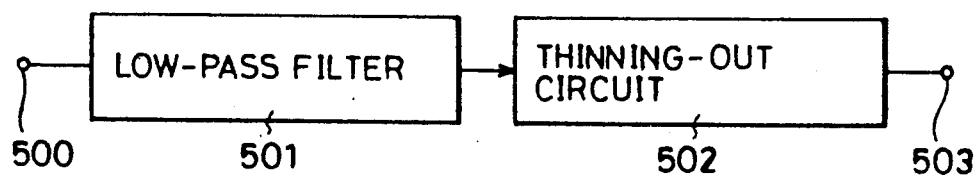
FIG.3
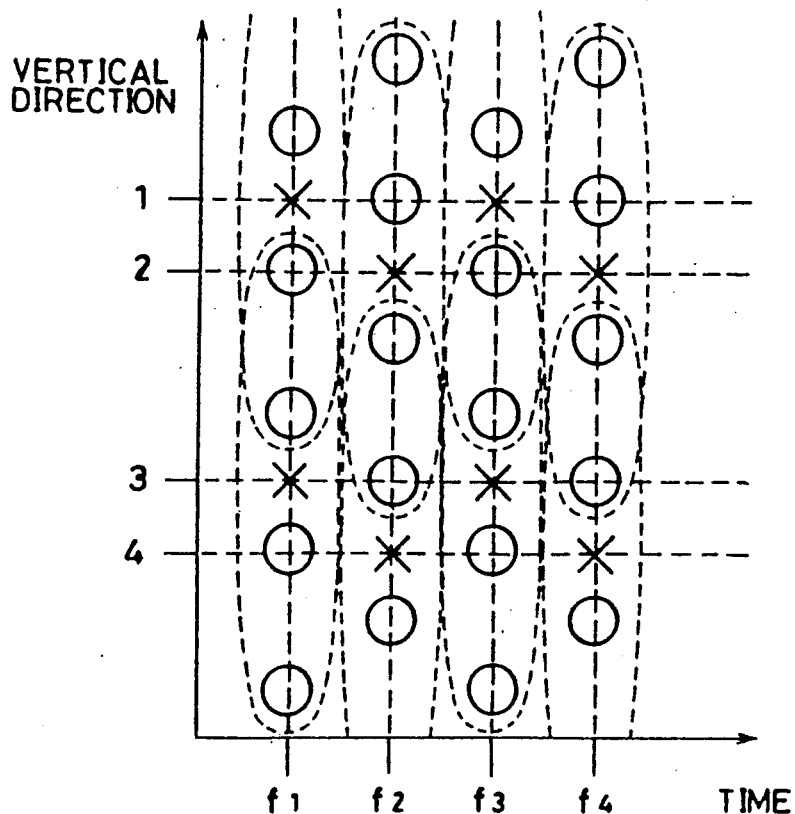

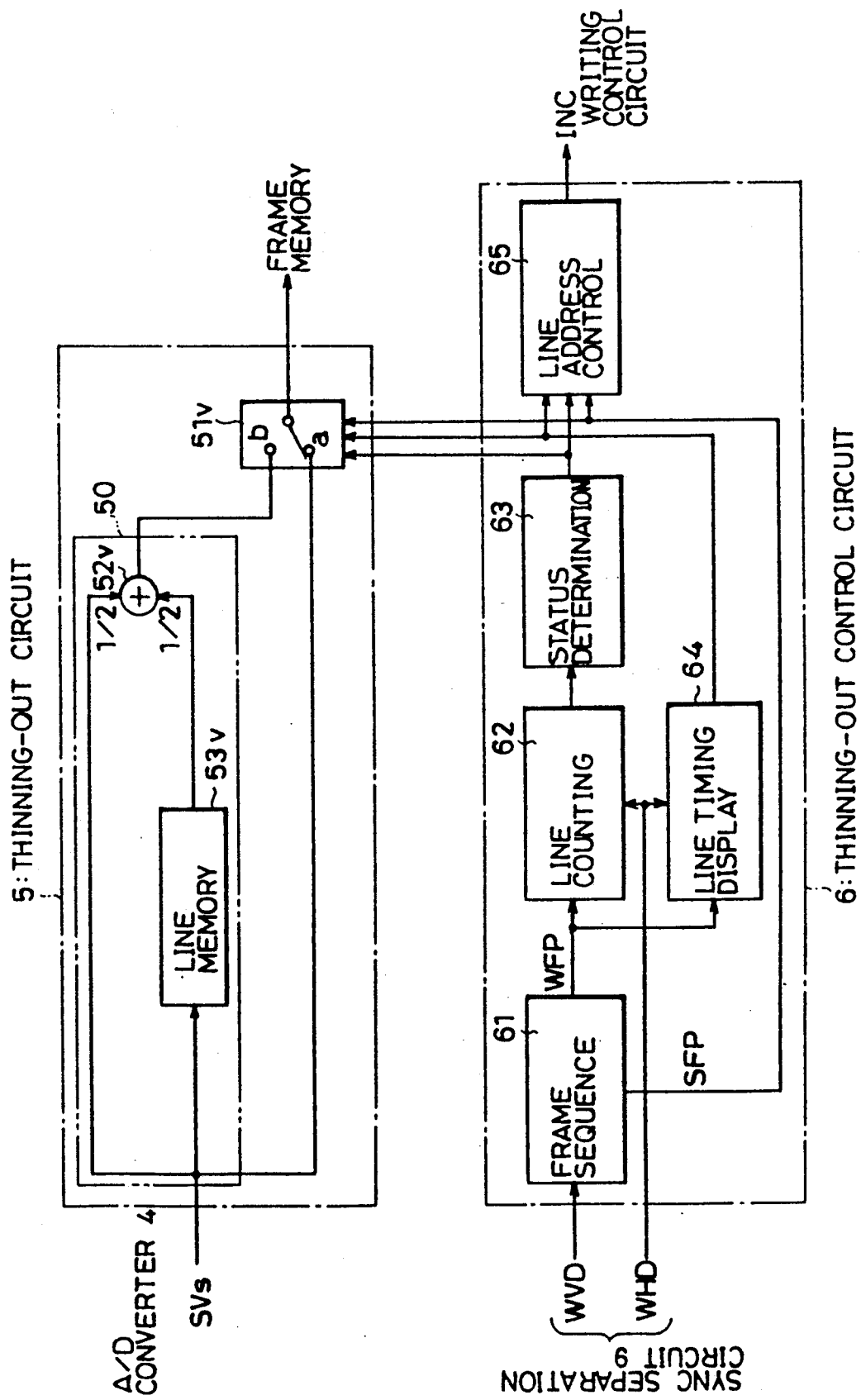

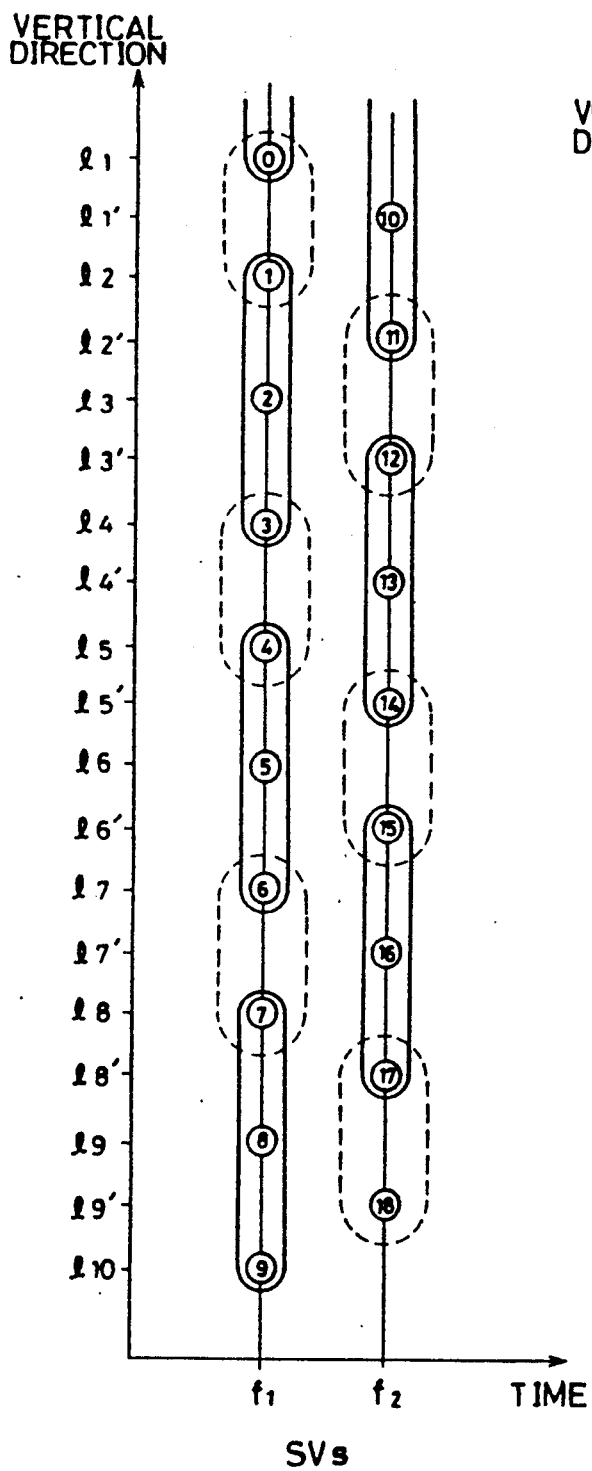
FIG.13A SVs SCANNING LINE STRUCTURE
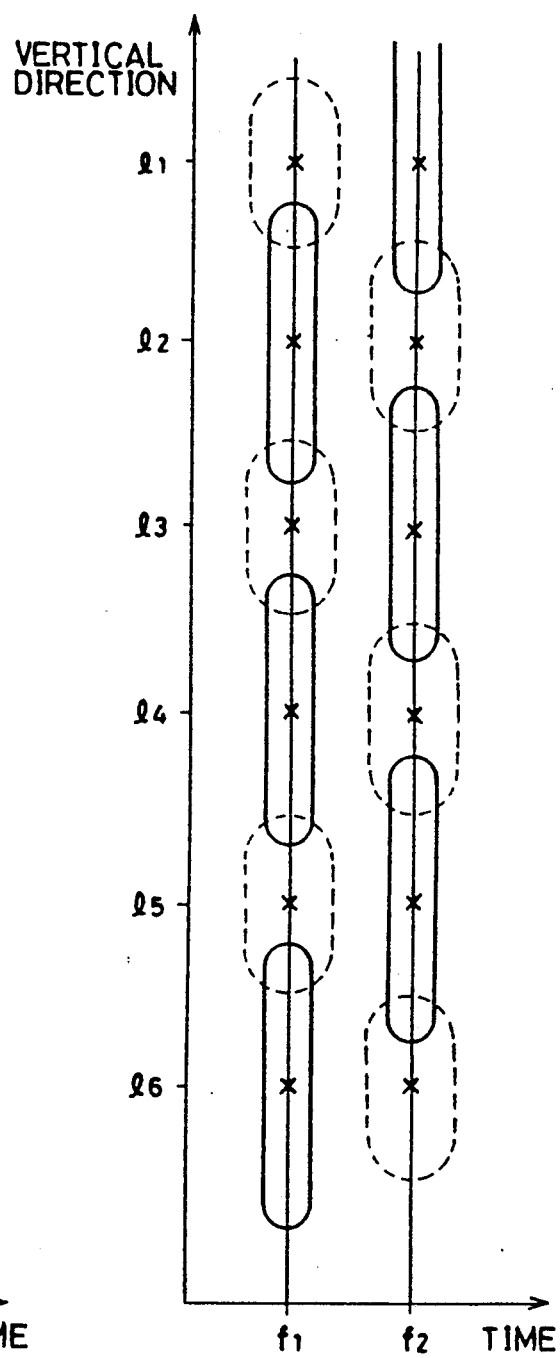
FIG.13B NON-INTERLACE SIGNAL SVs

NON-INTERLACE SIGNAL

SCANNING LINE STRUCTURE

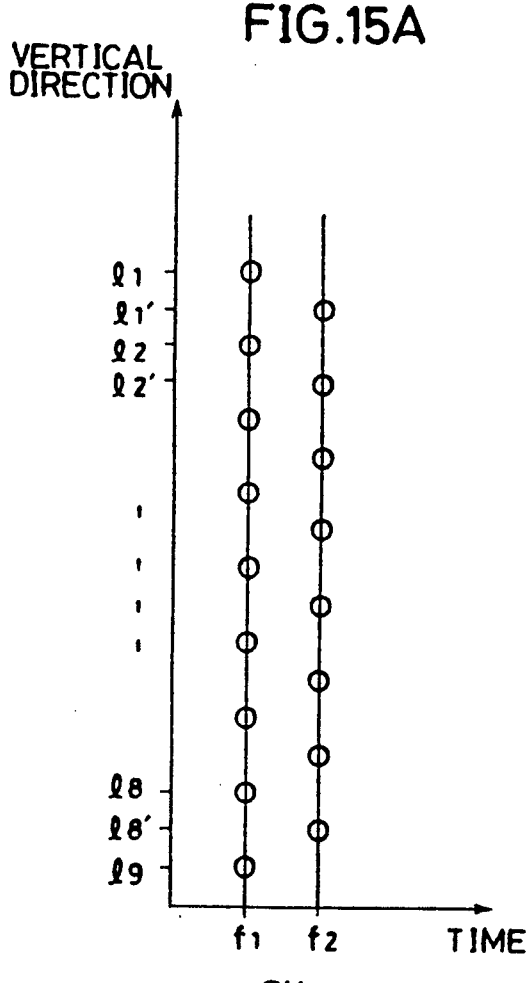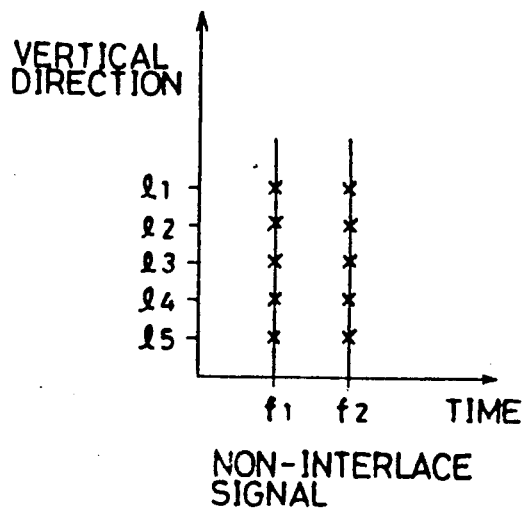
SCANNING LINE STRUCTURE

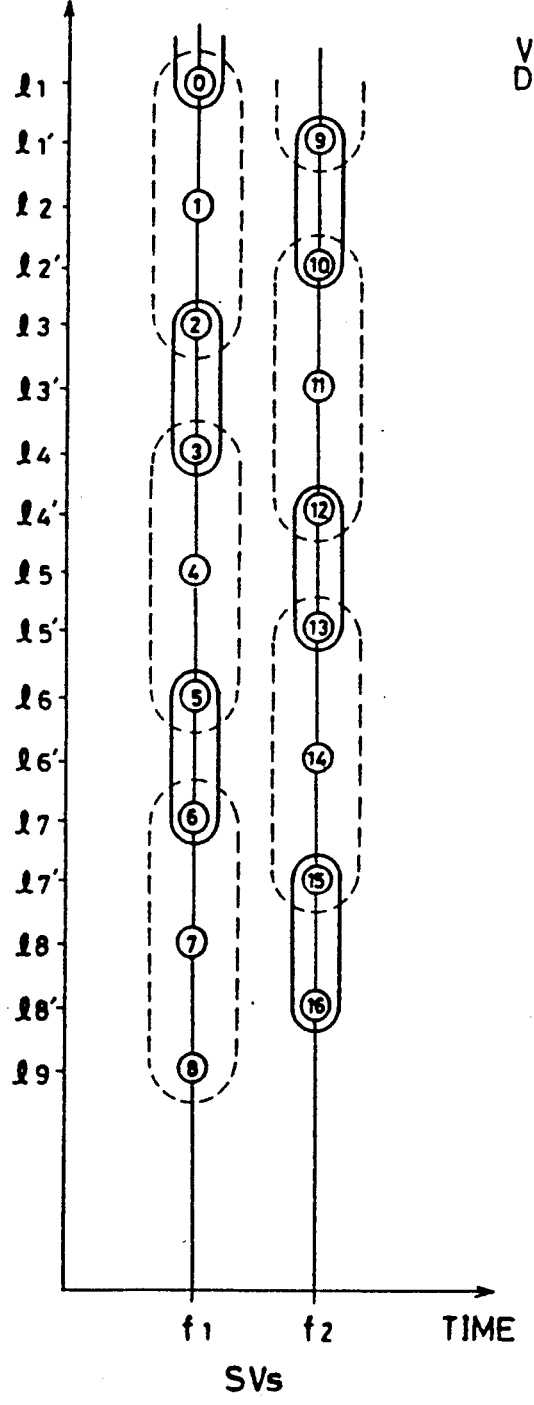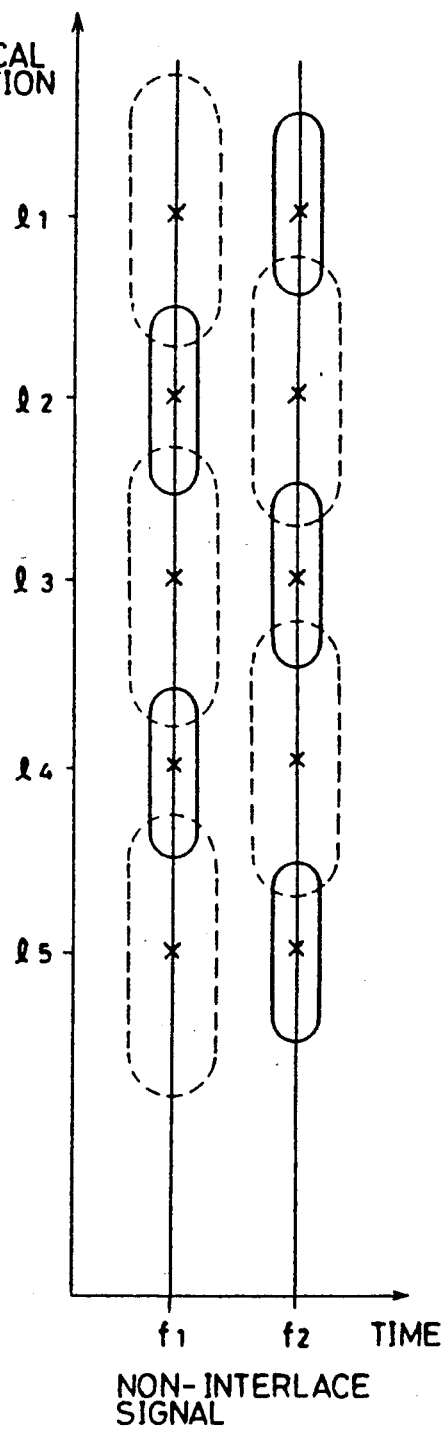
FIG.16A  SVs
FIG.16B  NON-INTERLACE SIGNAL
SCANNING LINE STRUCTURE

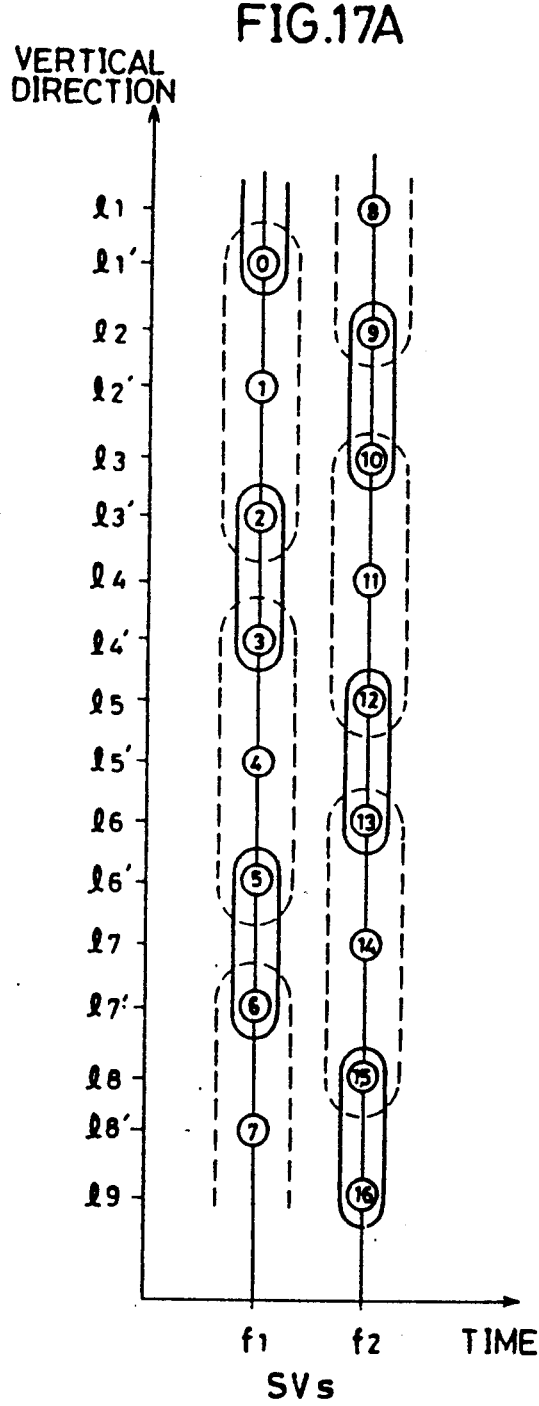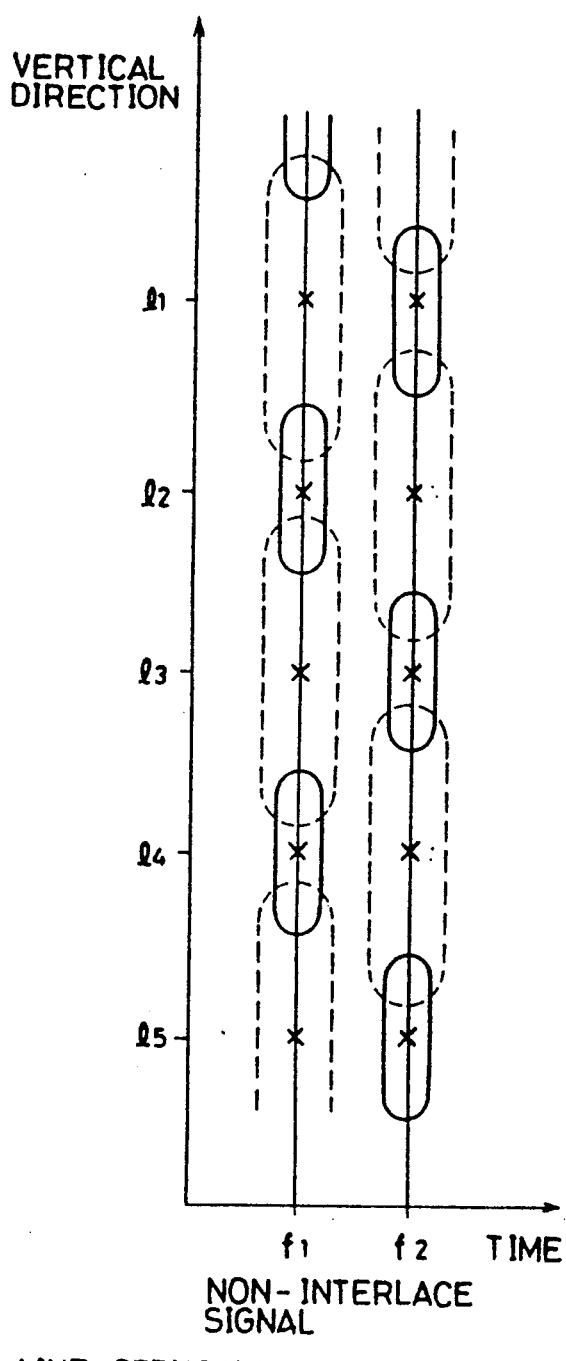
FIG.17A SVs
FIG.17B NON-INTERLACE SIGNAL
SCANNING LINE STRUCTURE

STATUS OF EACH FIELD PORTION IN FRAME MEMORY

DETERMINATION AS TO WHETHER FIELD IS EVEN OR ODD

--- EVEN FIELD
— ODD FIELD

DETERMINATION AS TO WHETHER FIELD IS EVEN OR ODD (a) FF 52h CP
(b) FF 52h Q
(c) FF 53h CP
(d) FF 53h Q

PARTIAL STRUCTURE OF SWITCH CONTROL PORTION

SCANNING LINE NUMBER CONVERTING DEVICE FOR VIDEO SIGNAL, AND DOWN-CONVERTER AND PICTURE-IN-PICTURE TV RECEIVER USING THE SAME

DESCRIPTION OF THE BACKGROUND ART

1. Field of the Invention

The present invention generally relates to scanning line number converting devices for video signals and to down-converters and picture-in-picture TV receivers using the same. More particularly, the present invention relates to a scanning line number converting device which reduces the scanning line number of a received video signal, and to a down-converter which converts, using the scanning line number converting device, a high-resolution TV signal with a large number of scanning lines into a video signal of NTSC system, and a picture-in-picture television receiver which projects, also using the scanning line number converting device, a video signal with a reduced number of scanning lines onto an ordinary TV screen to display two pictures.

2. Description of the Background Art

A scanning line number converting device which properly processes an interlaced input television signal to output a television signal having a different number of scanning lines from that of the input signal has been generally incorporated in a variety of apparatuses embodying specific purposes. As such apparatuses having specific purposes, for example, a picture-in-picture TV receiver (see "Nikkei Electronics", Apr. 14, 1980, Japanese Patent Publication No. 59-37913, Japanese Patent Laying-Open No. 62-269482, and so on) and a high-resolution TV/NTSC down-converter (refer to, for example, Japanese Patent Application No. 1-120128) are known.

The above-mentioned apparatuses all comprise a scanning line number converting device. Such a scanning line number converting device is configured according to purposes of use of an apparatus in which the device is incorporated. The scanning line number converting device is generally configured, however, to make conversion such that the scanning line number of an output signal is smaller than that of an input signal.

First, prior art of such a scanning line number converting device will be described.

A scanning line is generally considered as a vertical direction sampling in sampling a TV picture plane bidimensionally. An operation for reducing the scanning line number, therefore, is equal to that of reducing the vertical direction sampling frequency of the TV picture plane. Such an operation can be implemented by functions of the following two components.

One is a band limiting filter which limits a vertical spatial frequency component of a TV picture plane to less than ½ of a reduced vertical direction sampling frequency. The other is a scanning line thinning-out circuit which thins out scanning lines to reduce the vertical direction sampling frequency of a TV picture plane. The functions of those components are in accordance with the sampling theorem and their operation principles are self-evident.

FIG. 1A is a diagram showing the scanning line position of an interlace signal for each field f1, f2. In the diagram, "o" indicates a scanning line, position of which is shifted in the vertical direction by one line from one field to another. FIG. 1B is a diagram showing the scanning line position of a non-interlace signal for each field. In the diagram, "o" and "x" indicate together scanning lines. However, "o" is one corresponding to the interlace signal, while "x" is one properly produced by interpolating the interlace signal. Further, the scanning lines are located in the same position for all fields.

In FIGS. 1A and 1B, the abscissa represents time base with a field cycle as a unit and the ordinate represents the vertical direction with a scanning line interval as a unit.

FIG. 2 is a diagram showing a basic structure of a device which receives such an interlace signal to convert its scanning line number. FIG. 3 is a diagram for explaining operation of the scanning line number converting device shown in FIG. 2.

A signal applied to an input terminal 500 is limited in band by a vertical spatial frequency limiting low-pass filter 501 and then supplied to a thinning-out circuit 502. In the thinning-out circuit 502, the scanning lines are thinned out as shown in FIG. 3 so that scanning line signals corresponding to the signs "x" are outputted from an output terminal 503.

In FIG. 3, "o" indicates a scanning line corresponding to an input signal and "x" indicates one corresponding to an output signal. Further, "∴" indicates a tap range of the vertical spatial frequency limiting low-pass filter.

A TV signal entered in such a scanning line number converting device is an interlaced signal. Therefore, the output signal shown in FIG. 3 which has a reduced number of scanning lines has been also interlaced.

Meanwhile, an apparatus comprising a scanning line number converting device which outputs such a signal further processes the signal according to its purposes of use.

In such a case, since the signal to be handled has been interlaced, it is often required to make determination as to interlace sequence using field determining means. In the prior art, therefore, the apparatus has been configured such that field determination is made for the interlaced signal to execute the following signal processings based on the determination results.

In the following, reasons why field determination is required for signal processings will be described in connection with the above-mentioned two apparatuses.

First, description will be made on a picture-in-picture TV.

The basic structure of a picture-in-picture TV is described in "Nikkei Electronics" Apr. 14, 1980. That is, the picture-in-picture TV comprises a picture memory for absorbing time difference between a video signal for a main picture and that for a sub-picture and is configured such that the video signal for the sub-picture is written in the picture memory in synchronization with a synchronizing signal contained in itself and read out in synchronization with that contained in the video signal for the main picture to display the sub-picture in a predetermined position in the main picture.

The picture-in-picture TV configured in such a manner involves two problems in terms of technique. In prior art, field determining means has been employed to solve those problems.

Both of the two problems are generally caused by disagreement of signal phase between the video signal for the main picture and that for the sub-picture.

First, when there is no correspondence of interlace relationship between the video signal for the main picture and that for the sub-picture, since the above-mentioned picture memory is generally controlled on a field-by-field basis, the interlace relationship of the displayed sub-picture may be undesirably inverted (problem of incomplete interlace).

If the interlace relationship is inverted in such a manner, intense line flickers, double-image disturbance and the like occur on the sub-picture.

Secondly, when the vertical synchronizing signal phases of the video signal for the main picture and that for the sub-picture do not meet a certain relationship, the video signal for the sub-picture being read out of the picture memory is rewritten by another information for the subsequent field, so that pictures of different fields may be displayed on the upper and lower sides of the boundary between the main picture and the sub-picture (boundary problem).

When pictures of different fields are displayed on the upper and lower sides of the boundary between the main picture and the sub-picture, scanning lines on the boundary are clearly observed especially for moving pictures, causing visual disturbances. Further, since the interlace relationship is inverted between the upper and lower sides of the boundary, not only the scanning lines on the boundary are observed, but at the same time, the above-mentioned first problem occurs. That is, a normal picture can be displayed only on either of the upper and lower sides of the boundary, and line-flickers, double-image disturbance and the like will occur on the remaining side.

These two problems are basic ones which must be solved to enhance picture quality of the picture-in-picture television and for which a method using field determination means has been proposed.

For the first problem, field determination is first made on both video signals of the main and sub-pictures. The video signal for the sub-picture is written in a predetermined area of the picture memory based on the result of the field determination for itself. Further, the video signal for the sub-picture is read out with an appropriate starting phase, based on the result of the field determination for the main picture video signal. Thus, correspondence of the interlace relationships between the video signal for the main picture and that for the sub-picture is achieved, as has been proposed in Japanese Patent Publication No. 59-37913.

For the second problem, the picture memory is divided into four areas, two areas of which are allotted to a first field and the other two ones to a second field. Further, a passing prevention circuit is provided to make control such that reading and writing are not simultaneously applied to the same area. Thus, the so-called "passing" where the video signal for the sub-picture being read out of the picture memory is rewritten by another information of the subsequent field can be prevented, as has been proposed in Japanese Patent Publication No. 62-269482.

More specifically, the video signal for the sub-picture is written in a predetermined area of the picture memory, based on the result of the field determination for itself. Further, the passing prevention circuit makes field determination as to the video signal of the main picture and then reads out the sub-picture video signal from a first-written one out of the two areas which have field information corresponding to the determination result. Thus, reading and writing are applied to each field of the picture memory in a first-in-first-out fashion, allowing reading of field information to precede writing of another field information, so that "passing" can be prevented as described above.

The first and second problems can be, therefore, solved individually using the field determination means. Furthermore, if the control function described as a solution to the first problem which can bring about correspondence of the interlace relationships between the video signal for the main picture and that for the sub-picture is added to the passing prevention circuit described as a solution to the second problem, the two problems can be solved at a time.

Therefore, it is apparent that the field determination means is indispensable for the picture-in-picture TV technology.

Subsequently, description will be made on a high-resolution/NTSC down-converter.

A high-resolution TV/NTSC down-converter converts an interlaced high-resolution TV signal of a field rate of 60.00 Hz having 1125 scanning lines per one frame into an interlaced television signal of a field rate of 59.94 Hz having 525 scanning lines per one frame.

The converter has, therefore, two points to be noted; one is frame rate conversion and the other is scanning line number conversion.

Among them, problems involved in the frame rate conversion can be considered as the same ones accompanying the phase correspondence between the main and the sub-pictures as have been described in connection with the picture-in-picture TV. Therefore, the boundary problem due to a passing may be expected to occur.

Those problems can be, however, solved with the application of the field determination means and by use of the method described in Japanese Patent Laying-Open No. 62-269482.

However, many of the currently available down-converters do not carry out the conversion of frame rate. Therefore, while it has been pointed out that the boundary problem will arise in a future frame rate conversion, problems to be solved themselves have not yet come up in reality.

As to the scanning line number conversion, specific examples are described in the previously mentioned Japanese Patent Application No. 1-120128 and the like.

Now, description will be made on the high-resolution TV/NTSC down-converter. The high-resolution TV/NTSC down-converter comprises field determination means for making determination on an interlaced input signal as to whether the present field is even one or odd, scanning line number converting means for making an odd field and an even field of the interlaced video signal each contain 525 scanning lines and registration means for positioning scanning line signals of either an odd field or an even field outputted from the converting means in registration with those of the other, and converts the interlaced input signal into a non-interlaced TV signal having 525 scanning lines per one frame.

Since the signal outputted from the scanning line number converting means has been interlaced, the position of the scanning lines differs from one field to another. Therefore, the down converter is adapted to position, based on the results of the field determination, scanning lines of either field in registration with those of the other, preventing line flickers taking place.

The field determination means is, therefore, one of the indispensable elements to prevent occurrence of the line flickers.

As has been described with reference to the two apparatuses, a conventional apparatus comprising a scanning line number converting device employs the field determination means as an indispensable element for achieving its purposes.

When an apparatus is configured as described above and allows proper operation of the field determination means, both of the scanning line number converting device and the apparatus itself can properly operate, obviating any possible problems.

When a reproduced video signal from, for example, a home VTR is applied, however, the apparatus may not operate in order.

This is because the field determination means used as a solution to the problems may possibly malfunction against the video signal reproduced by the home VTR.

Such a malfunction of the field determination means in use with the video signal reproduced by the home VTR is attributable to noise which has been mixed in the vicinity of the vertical synchronizing signal due to switching of heads. Since the field determination means makes determination as to field sequence generally by comparing in phase the horizontal synchronizing signal and the vertical synchronizing signal, it may make an erroneous field determination when such noise has mixed in the vicinity of the vertical synchronizing signal as described above. Such a malfunction occurs with high probability in the case of particular reproductions such as picture search or slow reproduction.

Further, such a malfunction will take place not only for the video signal reproduced by the home VTR, but for those signals from a static picture photoplayer or a TV game machine. Malfunctions caused by such video signals are not, however, due to the noise as described above, but due to the output video signals themselves that have not been originally interlaced.

Operation of the field determination means for such non-interlaced video signals can not be generally defined at all. For example, it is entirely uncertain whether determination outputs of either one of the first and second fields should continue to be outputted or determination outputs of the first and second fields should be irregularly outputted. If the above-described solutions to the first and second problems are to be applied to such outputs, there is only a 50-50 chance that the problems can be effectively solved. In other words, there exists a possibility that the problems may not be effectively solved.

Thus, when the malfunction of the field determination means is taken into consideration, such signal processings as depending on the field determination means have limits.

Summarizing all described above, the following consequences can be obtained. That is, in a conventional scanning line number converting device and an apparatus comprising such a device, the field determination means has been used an an indispensable element for achieving their purposes of use. However, the field determination means may perform a malfunction and the resulting erroneous determination will hinder achievement of the whole purposes of the apparatus comprising the scanning line number converting device, as can be seen in the occurrence of line flickers, for example.

Such problems can be avoided by making the scanning line number converting device output non-interlace signals. As to a non-interlace signal, there is no such notion as "field". Therefore, by employing the non-interlace signal, no field determination means is required even in an apparatus comprising a scanning line number converting device.

SUMMARY OF THE INVENTION

An object of the present invention is to provide a scanning line number converting device which can output a non-interlace signal without making field determination.

Another object of the present invention is to provide a down-converter which can convert a high-resolution television signal into an NTSC television signal using such a scanning line number converting device.

Still another object of the present invention is to provide a picture-in-picture television which can display a main picture with a sub-picture inserted therein on the same picture plane.

A scanning line number converting device according to the present invention counts scanning lines of a video signal while limiting band of the vertical spatial frequency component of the video signal with a low-pass filter, and thins-out the scanning lines according to the count output.

The scanning line number converting device according to the present invention, therefore, can convert scanning line number of any signal without making field determination and provide a non-interlace signal. Accordingly, there is no need to consider degradation of picture quality caused by malfunctions of a field determination circuit.

According to a more preferred embodiment of the scanning line number converting device, a video signal is delayed by a delay circuit and then the video signal and the delayed video signal are added together to provide an addition output replacing the video signal, so that the vertical spatial frequency component of the video signal is limited in band.

A down-converter according to the present invention comprises a frame memory to and from which a video signal with thinned-out scanning lines is written in and read out and which can be controlled for asynchronous writing and reading such that writing to one field in the frame memory in can not be executed until reading from the same field is completed.

Therefore, with the use of the down-converter according to the present invention, whatever video signal is employed for a high-resolution TV picture, the problem of incomplete interlace caused by an erroneous field determination or the boundary problem will not arise, allowing good display of the high-resolution TV picture without causing any picture degradation.

In a picture-in-picture television using the scanning line number converting device according to the present invention, a second video signal having scanning lines thinned-out by the scanning line number converting device is written in the frame memory in a non-interlaced manner. The second video signal written in the frame memory is read out using a higher-speed clock signal than in the writing, time base of which is then compressed. A field determination is made on the second video signal with respect to a first video signal. According to the determination result, the second video signal is read out of the frame memory while undergoing interlace conversion from the non-interlaced state such that the second video signal takes a proper interlace sequence with respect to the first video signal.

In the picture-in-picture according to the present invention, therefore, the field determination in writing can be made unnecessary. Accordingly, even when a video signal reproduced from a home video tape recorder is applied to the second video signal for the sub-picture, the problem of incomplete interlace due to an erroneous field determination or the boundary problem will not arise, allowing good display of the sub-picture without any picture degradation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a diagram showing scanning line structure of an interlace signal.

FIG. 1B is a diagram showing scanning line structure of a non-interlace signal.

FIG. 2 is a schematic block diagram showing a conventional scanning line number converting device which receives an interlace signal to convert its scanning line number.

FIG. 3 is a diagram for explaining operation of the scanning line number converting device shown in FIG. 2.

FIG. 8 is a schematic block diagram showing a thinning-out circuit and a thinning-out control circuit in the case of a ½ scanning line number.

FIGS. 9A, 9B, 10A, 10B, 11A, 11B, 12A, 12B, 13A, 13B, 14A, 14B, 15A, 15B, 16A, 16B, 17A and 17B are diagrams for explaining an interlacing manner in the case of a ⅓ scanning line number.

DESCRIPTION OF THE PREFERRED EMBODIMENTS

Figure 4:
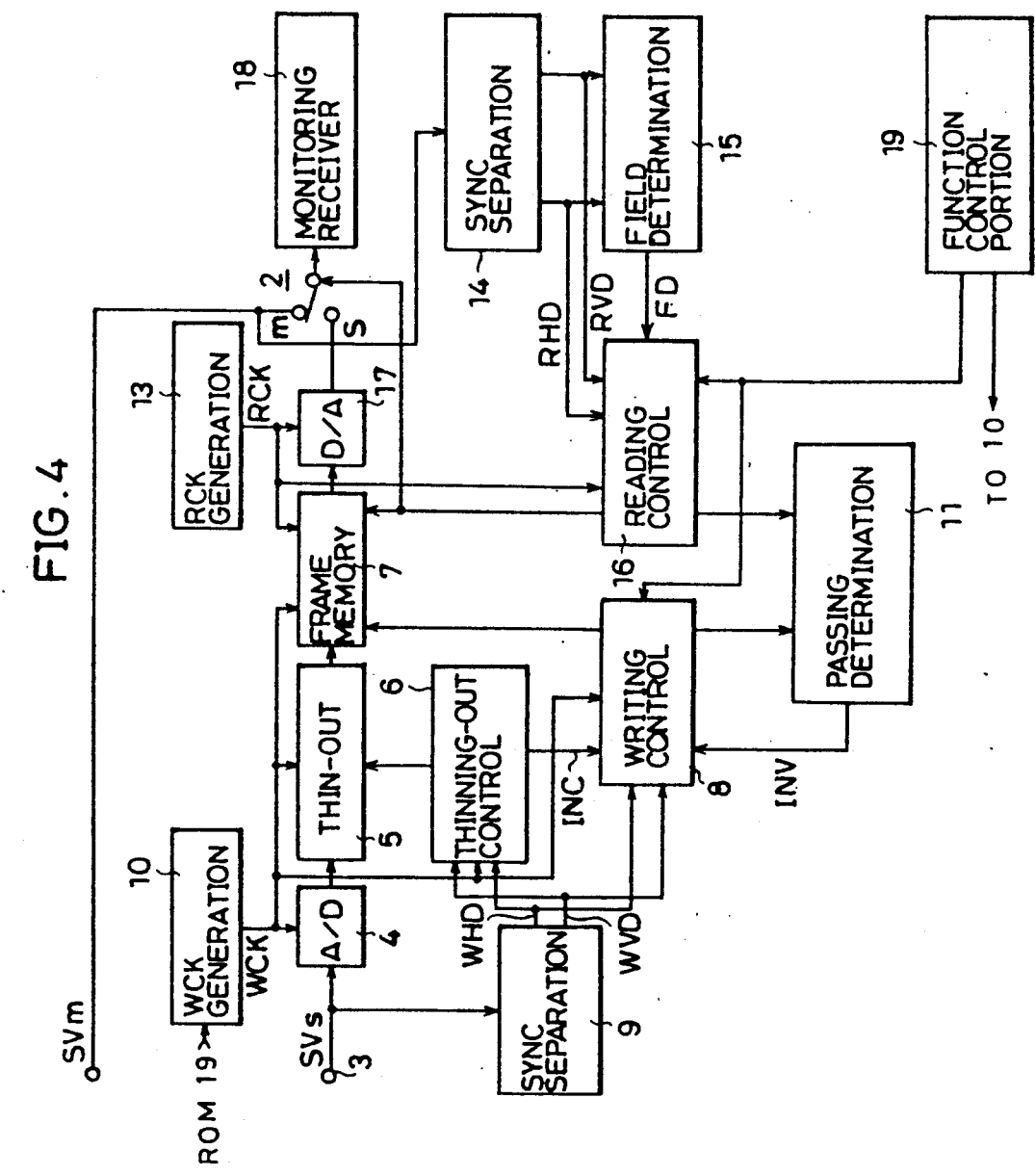
FIG. 4 is a schematic block diagram of an embodiment of the present invention.

FIG. 4 is a block diagram of an embodiment according to the present invention. Referring to the diagram, an input terminal 1 receives a video signal SVm, for example an NTSC signal, as reference signal. The video signal SVm is coupled to a fixed terminal m of a selector switch 2.

Since the video signal SVm undergoes sync separation to be used as timing reference for output signal from a down converter, as will be described later, it does not matter at all what kind of picture the signal represents.

Further, another input terminal 3 receives a video signal SVs, for example, a high-resolution TV signal. The video signal SVs is converted into a digital signal by an A/D converter 4 before supplied to a thinning-out circuit 5. The thinning-out circuit 5 is provided for thinning out scanning lines, and its operation is controlled by a thinning-out control circuit 6.

Output signal of the thinning-out circuit 5 is supplied as write signal to a frame memory 7 comprised of, for example, an RAM. Writing operation in this frame memory 7 is controlled by a writing control circuit 8.

The video signal SVs received at the input terminal 3 is also supplied to a sync separation circuit 9 where a vertical synchronizing signal WVD and a horizontal synchronizing signal WHD are separated to be supplied to the thinning-out control circuit 6 and the writing control circuit 8.

Further, a writing clock generating circuit 10 is constituted of, for example, a PLL circuit. A clock WCK outputted from the writing clock generating circuit 10 is supplied to the A/D converter 4, the thinning-out circuit 5 and the thinning-out control circuit 6.

In the above-mentioned thinning-out circuit 5, a reduction in vertical direction sampling frequency is made by thinning-out scanning lines in the vertical direction. To reduce the sampling frequency, a low-pass filter suited to the reduced frequency is inserted in advance so as to eliminate any signal component above the Nyquist frequency. Besides the reduction of sampling frequency, the thinning-out circuit 5 interpolates scanning line signals to form non-interlace signals.

The reduction of sampling frequency and the formation of non-interlace signals are described in detail below.

Here will be exemplified those cases where the scanning line number in one field of output signal is set to be ½, ⅓ and ¼ of that in one frame of input signal. When combinations are made among those cases, almost any number of scanning lines can be realized.

What is to be noted here is the reduction of sampling frequency in the vertical direction and the formation of non-interlace signals without use of field determination means. Therefore, the following description will be made centering on these two points.

First, the case will be described where the number of scanning lines in one field of output signal is set to be ½ of that in one frame of input video signal.

Assuming now for convenience sake that the line number in one field of the video signal SVs is ln, the line number in one field of the non-interlace signal to be outputted is given as follows.

ln÷2×2=ln (lines)

In the expression above, "÷2" indicates that the number of scanning lines is made ½ and "×2" indicates that the line number is doubled due to the non-interlacing.

In this manner, the line number to be outputted in one field becomes equal to that in one field of the video signal SVs so that the non-interlacing is implemented as follows.

When the line number in one frame of the video signal SVs is even, the video signal SVs itself is considered to be a non-interlace signal. All the scanning line signals in every field of the video signal SVs themselves are allotted for scanning line signals in each field of the non-interlace signal.

Further, when the line number in one frame of the video signal SVs is odd, or 2n+1 (n is positive integer), the following processings will be made in each frame period using a frame pulse as reference which is obtained by ½ frequency-dividing the vertical synchronizing signal WVD.

The first n scanning line signals of the video signal SVs are allotted for scanning line signals of one field of the non-interlace signal. Subsequently, the remaining n+1 scanning line signals of the video signals SVs are used to form interpolate scanning line signals such that the scanning lines are located in the same position as the above-mentioned n scanning lines. The interpolate scanning line signals are allotted for scanning line signals of the other field of the non-interlace signal.

Figure 5A:
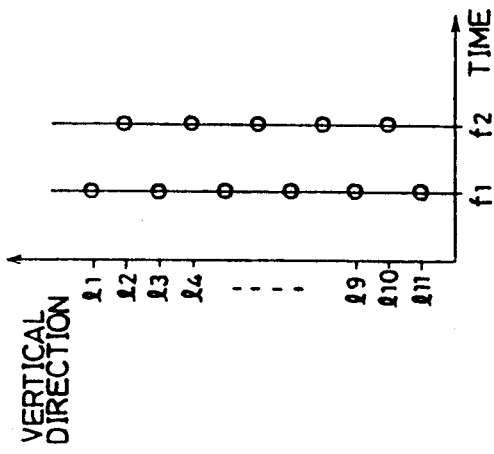
FIG. 5A is a diagram showing scanning line structure of a video signal SVs.
Figure 5B:
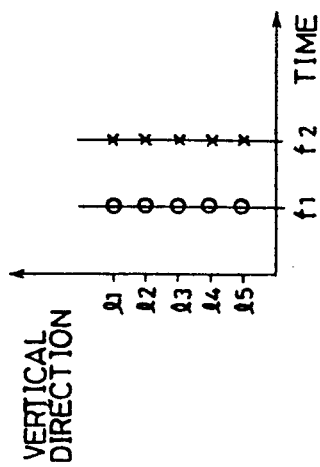
FIG. 5B is a diagram showing scanning line structure of a non-interlace signal written in the frame memory shown in FIG. 4.

FIG. 5A shows the video signal SVs, where "o" indicates a scanning line. FIG. 5B shows the non-interlace signal written in the frame memory 7, where "x" indicates a scanning line formed of an interpolate scanning line signal.

Figure 6A:
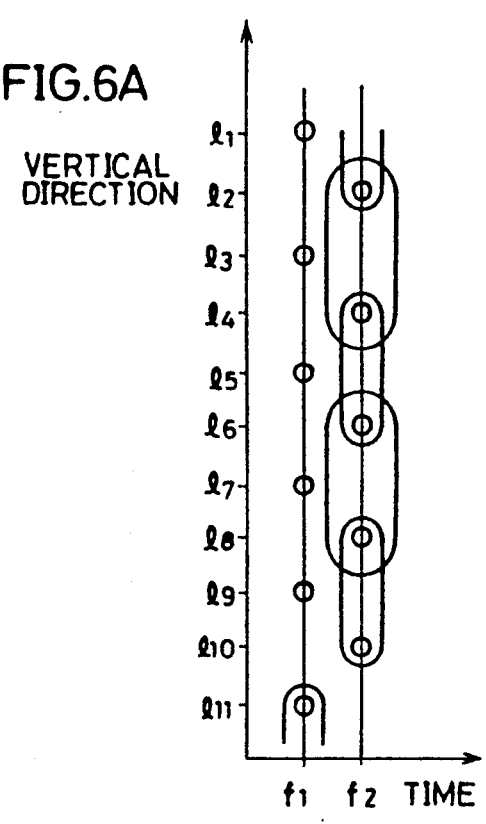
FIGS. 6A, 6B, 7A and 7B are diagrams for explaining an interlacing manner in the case of a ½ scanning line number.

The interpolate scanning line signal is formed, for example, by taking arithmetic mean between adjacent upper and lower lines. That is, for the remaining n+1 lines, two scanning lines are combined, as encircled with solid line in FIG. 6A, using the frame pulse as reference, and added with a ratio of ½ to each other, thereby to form an interpolate scanning line signal.

Figure 6B:
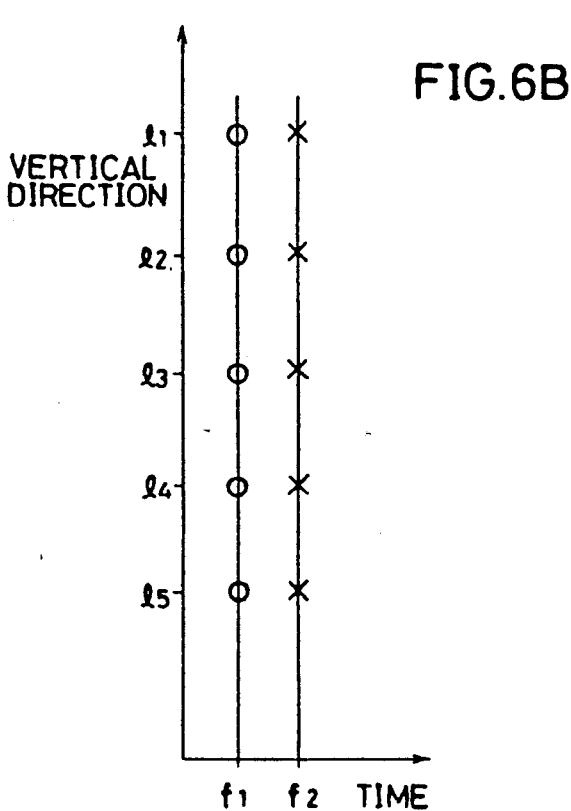

FIG. 6B shows a non-interlace signal formed as described above. In this diagram, position of each scanning line in the vertical direction is shown in registration with that in FIG. 6A so as to make it clear to which position of the video signal SVs each scanning line corresponds.

More specifically, the non-interlace signal is formed by making operation such that a scanning line l1 of the non-interlace signal corresponds to a position l1 of the video signal SVs, a scanning line l2 of the non-interlace signal to a position l3 of the video signal SVs and so on.

Figure 7A:
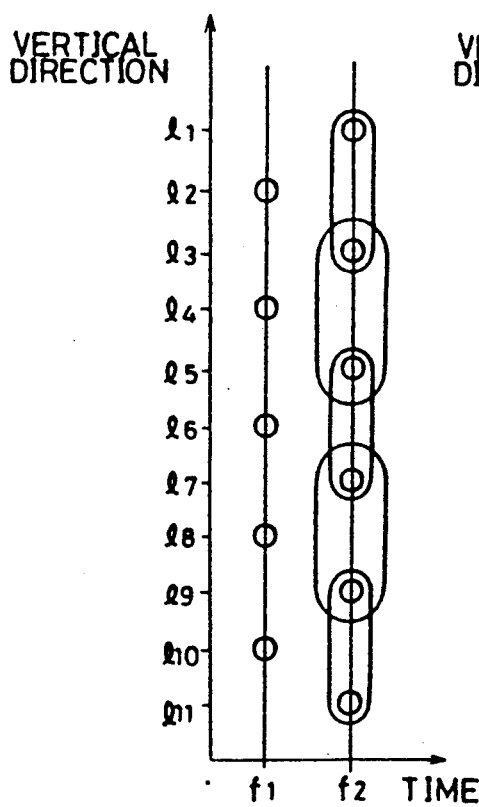
Figure 7B:
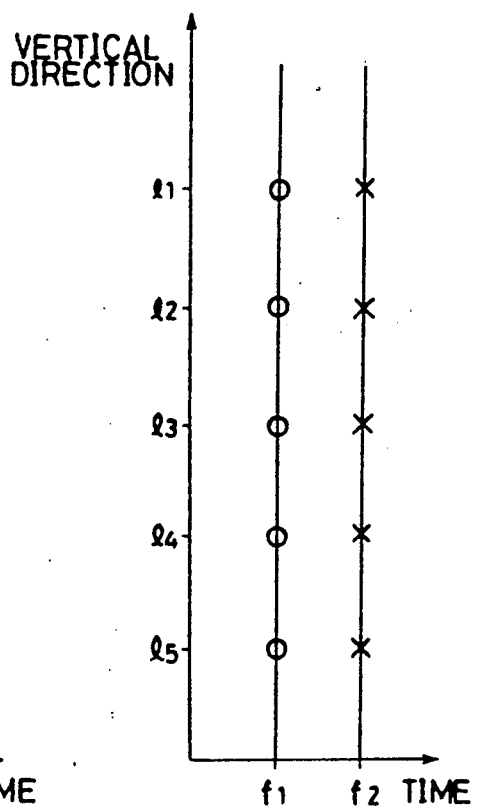

In the description above, the frame pulse has been used as reference. When the frame pulse is inverted in phase, however, the interpolate scanning line signal is formed as shown in FIG. 7A, and the non-interlace signal is formed as shown in FIG. 7B. In this case, the scanning line l1 of the non-interlace signal corresponds to a position l2 of the video signal SVs, the scanning line l2 of the non-interlace signal to a position l4 of the video signal SVs and so on. Thus, when compared with the case shown in FIGS. 6A and 6B, the position of scanning lines is shifted by one line, but fixed for every field. Therefore, the non-interlace signal is formed in the same manner.

While in FIGS. 5A to 7B, the line number in one frame of the video signal SVs is assumed to be 11, the non-interlace signal is formed generally in the same manner if only the number is odd.

FIG. 8 is a diagram showing a specific structure of the thinning-out circuit 5 and the thinning-out control circuit 6 for making the above-described processings.

In FIG. 8, the video signal SVs from the A/D converter 4 is supplied to a fixed terminal on a side of a selector switch 51ν. Also, the video signal SVs is supplied to an adder 52ν through a line memory 53ν serving as a delay element for providing a delay time of one horizontal period, as well as directly to the adder 52ν. The adder 52ν constitutes together with the line memory 53ν a low-pass filter. In the adder 52ν, two signals are added with a ratio of ½ to each other, and its output signal is supplied to another fixed terminal on b side of the selector switch 51ν as an interpolate scanning line signal.

The vertical synchronizing signal WVD from the sync separation circuit 9 is supplied to a frame sequence circuit 61 comprised of a T flip-flop, a gate circuit and the like. In the frame sequence circuit 61, a frame pulse WFP is formed by ½ frequency-dividing the vertical synchronizing signal WVD and at the same time, a signal SFP is formed which indicates whether a field contains this frame pulse WFP or not.

The frame pulse WFP from the frame sequence circuit 61 is supplied to a line counter circuit 62 comprised of a counter or the like, which receives also the horizontal synchronizing signal WHD from the sync separation circuit 9 to count line number in one frame. Line number data for one frame from this counter circuit 62 is supplied to a status determining circuit 63 where determination is made as to whether the line number in one frame is even or odd.

Further, the frame pulse WFP from the frame sequence circuit 61 is supplied to a line timing display circuit 64 comprised of a counter or the like, which also receives the horizontal synchronizing signal WHD from the sync separation circuit 9. In this timing display circuit 64, the number of the current line from the frame pulse WFP is counted.

The signal SFP from the above-mentioned frame sequence circuit 61, a determination signal from the status determining circuit 63, and count data from the timing display circuit 64 are supplied to the selector switch 51ν of the thinning-out circuit 5 as switching control signals.

More specifically, the selector switch 51ν remains on the a side when the line number of one frame is even. On the other hand, when the line number of one frame is odd, the selector switch 51ν is put on the a side during the period from the frame pulse to the n-th line, and on the b side during the period for the remaining n+1 lines.

In this manner, a non-interlace signal with a ½ scanning line number is outputted from the selector switch 51ν.

In the thinning-out control circuit 6, the signal SFP from the frame sequence circuit 61, the determination signal from the status determining circuit 63 and the count data from the timing display circuit 63 are supplied to a line address control circuit 65. The line address control circuit 65 supplies an increment signal INC for line address to the writing control circuit 8. This increment signal INC is also supplied as an enable signal WE, as will be described later.

Secondly, the case will be described where the scanning line number is ⅓.

Assuming now for convenience sake that the line number of one field of the video signal SVs is ln, the line number in one field of the non-interlace signal to be outputted is given as follows.

$$ln \div 3 \times 2 = 2ln/3 \text{ (lines)}$$

In the expression above, "÷3" indicates that the scanning line number is made ⅓ and "×2" indicates that the scanning line number is doubled due to the non-interlacing.

In this manner, since the line number in one filed to be outputted is made ⅔ of that in one field of the video signal SVs, the non-interlacing is implemented depending on the line number in one frame of the video signal SVs as described below.

When the line number in one frame of the video signal SVs is even (for example, 526, 626, 1050 and 1250), the video signal SVs itself is considered to be a non-interlace signal. In this case, for each field of the video signal SVs, two scanning line signals are formed of 3n+0-th, 3n+1-th and 3n+2-th scanning line signals to be allotted for scanning line signals of each field of the non-interlace signal. For example, for every three lines the following control is repeated.

For the 3n+0-th lines, the current scanning line signal and that of one line before are added with a ratio of ½ to each other to form a scanning line signal of the non-interlace signal.

For the 3n+1 lines, no scanning line signal of the non-interlace signal is formed.

For the 3n+2-th lines, the current scanning line signal, and those of one line and two lines before are added together with a ratio of ¼, ½ and ¼, respectively, to form a scanning line signal of the non-interlace signal.

Further, when the line number in one frame of the video signal SVs is 6k+3 (k is positive integer, for example, 525, 627 and 1125), control is repeated, using the frame pulse obtained by ½ frequency-dividing the vertical synchronizing signal WVD as reference, for every three lines in each frame period to form scanning line signals of the non-interlace signal.

Figure 9A:
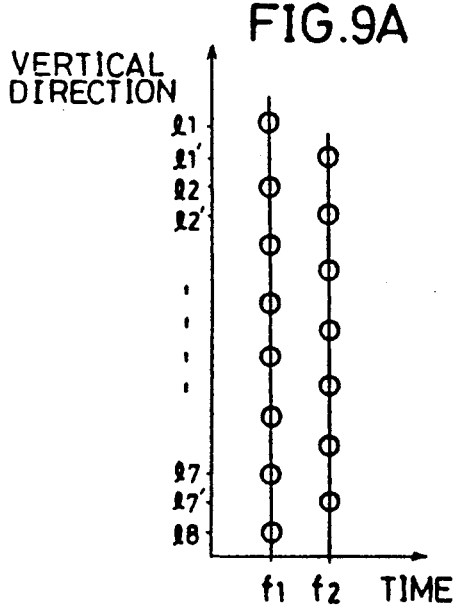
Figure 9B:
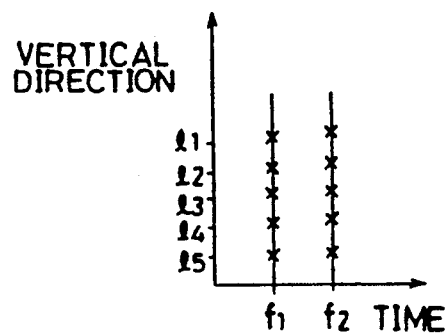

FIG. 9A is a diagram showing the video signal SVs, where "o" indicates a scanning line. FIG. 9B is a diagram showing the output non-interlace signal, where "x" indicates a scanning line. In this case, all the scanning line signals of the non-interlace signal are formed by operating a plurality of scanning line signals of the video signal SVs.

For example, the following control is repeated for every three lines in each frame period.

Figure 10A:
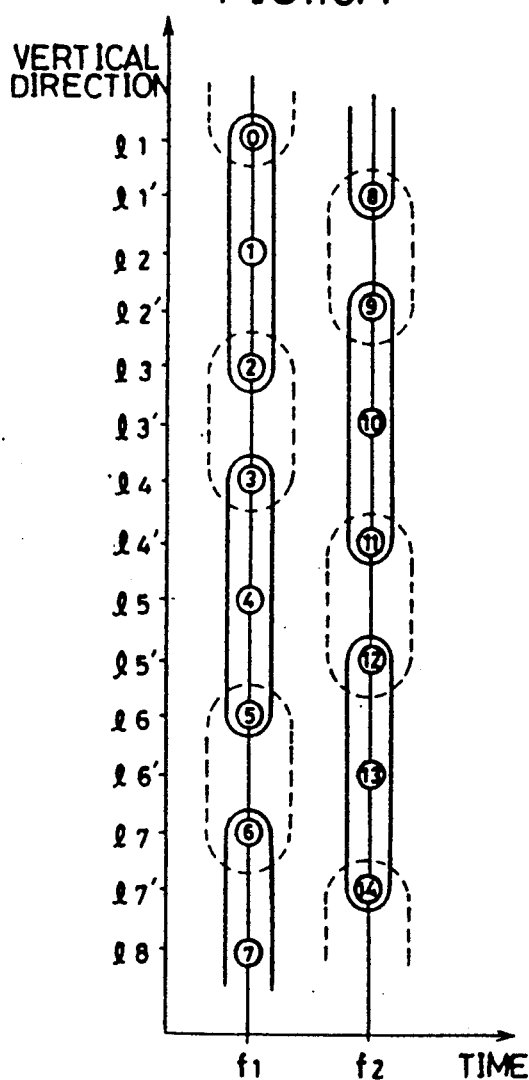

For the 3n+0 (0, 3, 6, ... )-th lines from the frame pulse, the current scanning line signal and that of one line before, encircled together with broken line in FIG. 10A, are added with a ratio of ½ to each other to form a scanning line signal of the non-interlace signal.

For the 3n+1 (1, 4, 7, ... )-th lines, no scanning line signal of the non-interlace signal is formed.

For the 3n+2 (2, 5, 8, ... )-th lines, the current scanning line signal and those of one line and two lines before, encircled together with solid line in FIG. 10A, are added with a ratio of ¼, ½ and ¼, respectively, to form a scanning line signal of the non-interlace signal.

Meanwhile, in FIG. 10A, "ⓧ (x=0 to 14)" is a scanning line.

Figure 10B:
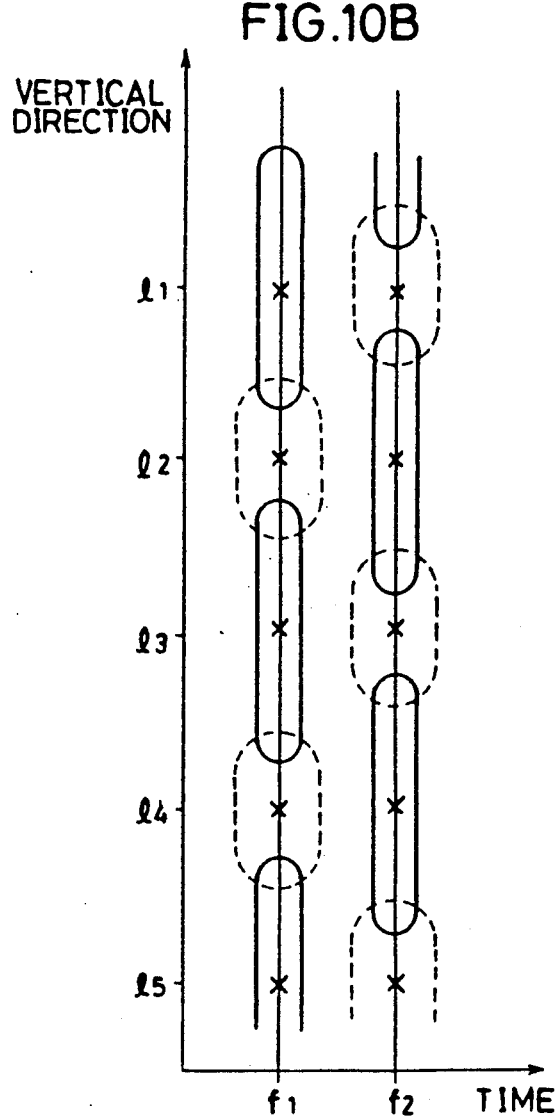

In FIG. 10B, there is shown the non-interlace signal formed by repeating the control described above, where "x" indicates a scanning line. In the diagram, position of each scanning line in the vertical direction is shown in registration with that in FIG. 10A to make clear to which position of the video signal SVs each scanning line corresponds.

More specifically, the non-interlace signal is formed by making operation such that a scanning line l1 of the non-interlace signal corresponds to a position l2 of the video signal SVs, a scanning line l2 of the non-interlace signal to a position l3' of the video signal SVs and so on.

Figure 11A:
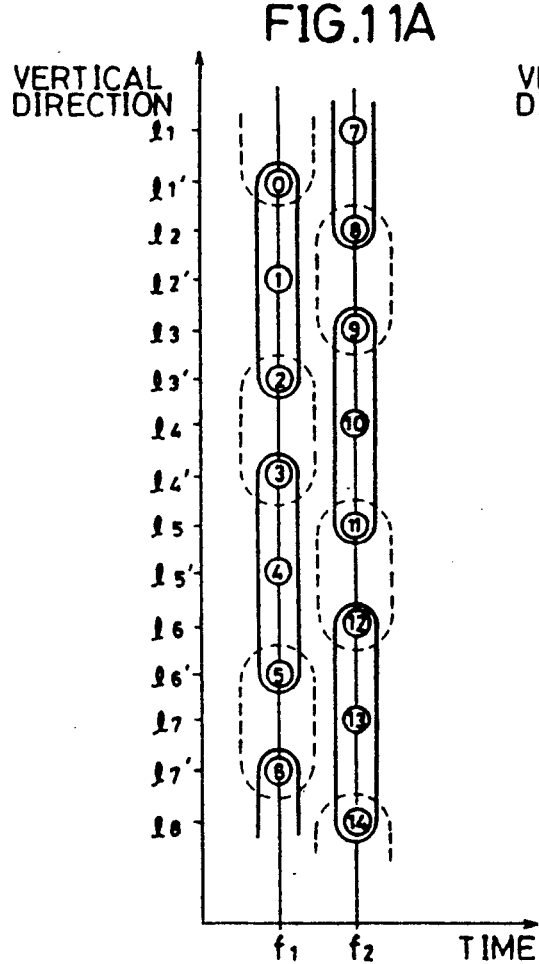
Figure 11B:
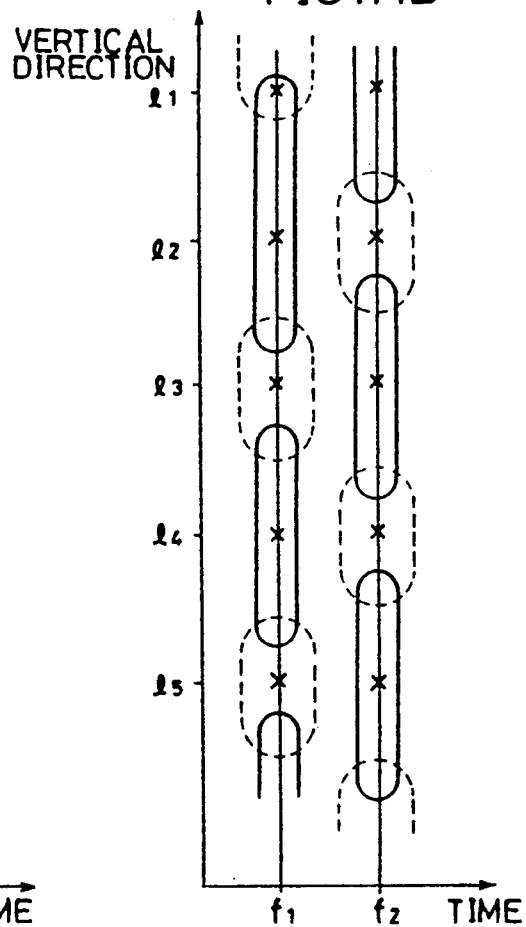

In the description above, the frame pulse has been used as reference. When the frame pulse is inverted in phase, processings are made as shown in FIG. 11A to form a non-interlace signal as shown in FIG. 11B. In this case, the scanning line l1 of the non-interlace signal corresponds to the position l1 of the video signal SVs, the scanning line l2 of the non-interlace signal to the position l2' of the video signal SVs and so on. Thus, when compared with the case shown in FIGS. 8A and 8B, the position of scanning lines is shifted by two line, but fixed for every field. Therefore, the non-interlace signal is formed in the same manner.

While in FIGS. 8A to 10B, the description has been made assuming the scanning line number of the video signal SVs as 15, the non-interlace signal is formed generally in the same manner when the scanning line number is 6k+3, for example, 525, 627 and 1125.

When the line number in one frame of the video signal SVs is 6k+1 (k is positive integer, for example, 523, 625, 1123 and so on), control is repeated for every three lines to form scanning line signals of the non-interlace signal. In this case, the control is changed between a field containing the frame pulse obtained by ½ frequency-dividing the vertical synchronizing signal WVD and a field containing no such pulse.

Figure 12A:
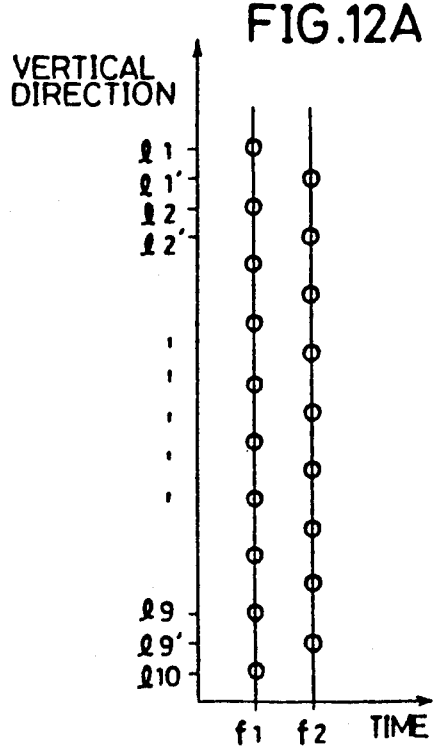
Figure 12B:
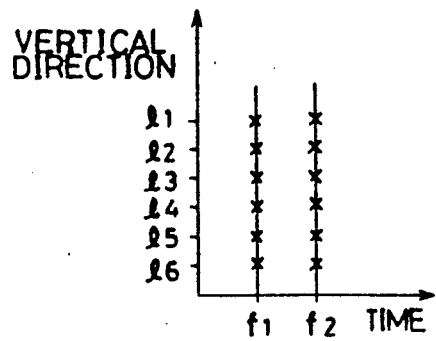

FIG. 12A is a diagram showing the video signal SVs, where "o" indicates a scanning line. FIG. 12B is a diagram showing the output non-interlace signal, where "x" indicates a scanning line. In this case, all the scanning line signals of the non-interlace signal are formed by operating a plurality of scanning line signals of the video signal SVs.

For example, the following controls will be repeated for every three lines of a field containing the frame pulse and that containing no frame pulse.

In FIG. 13A, it is assumed now that a field f1 contains the frame pulse. In this field f1, for the 3n+0 (0, 3, 6, ... )-th lines from the frame pulse, the current scanning line signal and those of one line and two lines before, encircled together with solid line in FIG. 13A, are added together with a ratio of ¼, ½ and ¼, respectively, to form a scanning line signal of the non-interlace signal.

For the 3n+1 (1, 4, 7, ... )-th lines, no scanning line signal is formed for the non-interlace signal.

For the 3n+2 (2, 5, 8, ... )-th lines, the scanning line signals one line and two lines before, encircled together with broken line in FIG. 13A, are added with a ratio of ½ to each other to form a scanning line signal of the non-interlace signal.

Further, in a field f2 containing no frame pulse, for the 3n+0 (12, 15, 18, ... )-th lines from the frame pulse the current scanning line signal and that of one line before, encircled together with broken line in FIG. 13A, are added with a ratio of ½ to each other to form a scanning line signal of the non-interlace signal.

For the 3n+1 (13, 16, 19, ...)-th lines, no scanning line signal of the non-interlace signal is formed.

For the 3n+2 (11, 14, 17, ...)-th lines, the current scanning line signal and those of one line and two lines before, encircled together with solid line in FIG. 13A, are added with a ratio of ¼, ½ and ¼, respectively, to form a scanning line signal of the non-interlace signal.

Meanwhile, in FIG. 13A, "(x) (x=0 to 18)" is a scanning line.

FIG. 13B is a diagram showing the non-interlace signal formed by repeating the control described above, where "x" indicates a scanning line. In this diagram, position of each scanning line in the vertical direction is shown in registration with that in FIG. 13A to make clear to which position of the video signal SVs each scanning line corresponds.

More specifically, the non-interlace signal is formed by making operation such that a scanning line 11 of the non-interlace signal corresponds to a position 11' of the video signal SVs, a scanning line 12 of the non-interlace signal to a position 13 of the video signal SVs and so on.

While in the description above, for the 3n+1-th lines of a field containing the frame pulse, no scanning line signal of the non-interlace signal is formed, but for the 3n+2-th lines, a scanning line signal of the non-interlace signal is formed of the scanning line signals of one line and two lines before, the scanning line signals may be formed in a different manner. For example, it may also be possible to form a scanning line signal of the non-interlace signal from the current scanning line signal and that of one line before for the 3n+1-th lines and form no scanning line signal of the non-interlace signal for the 3n+2-th lines.

Meanwhile, when the frame pulse is inverted in phase, the processings as shown in FIG. 13A are made to form the non-interlace signal as shown in FIG. 13B. In this case, the scanning line 11 of the non-interlace signal corresponds to the position 12 of the video signal SVs, the scanning line 12 of the non-interlace signal to the position 13' of the video signal SVs and so on. Thus, when compared with the case shown in FIGS. 13A and 13B, the position of scanning lines is shifted by one line, but fixed for every field. Therefore, the non-interlace signal can be formed in the same manner.

While in FIGS. 11A to 13B, the description has been made assuming the scanning line number of the video signal SVs as 19, the non-interlace signal can be formed generally in the same manner if the scanning line number is 6k+1, for example, 523 and 625.

Further, if the line number in one frame of the video signal SVs is 6k+5 (k is positive integer, for example, 527, 623, 1127 and like), control is repeated for every three lines to form scanning line signals of the non-interlace signal. As in the case where one frame contains 6k+1 lines, the control is changed between a field containing the frame pulse obtained by ½ frequency-dividing the vertical synchronizing signal WVD and a field containing no such pulse.

Figure 14A:
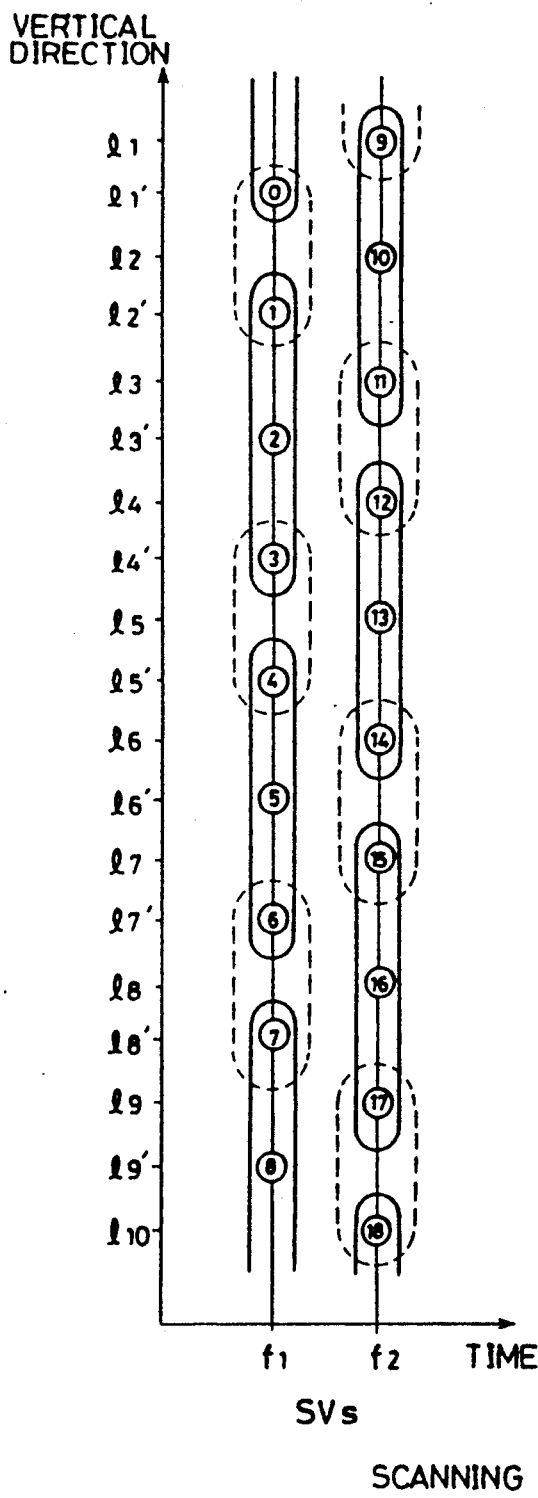
Figure 14B:
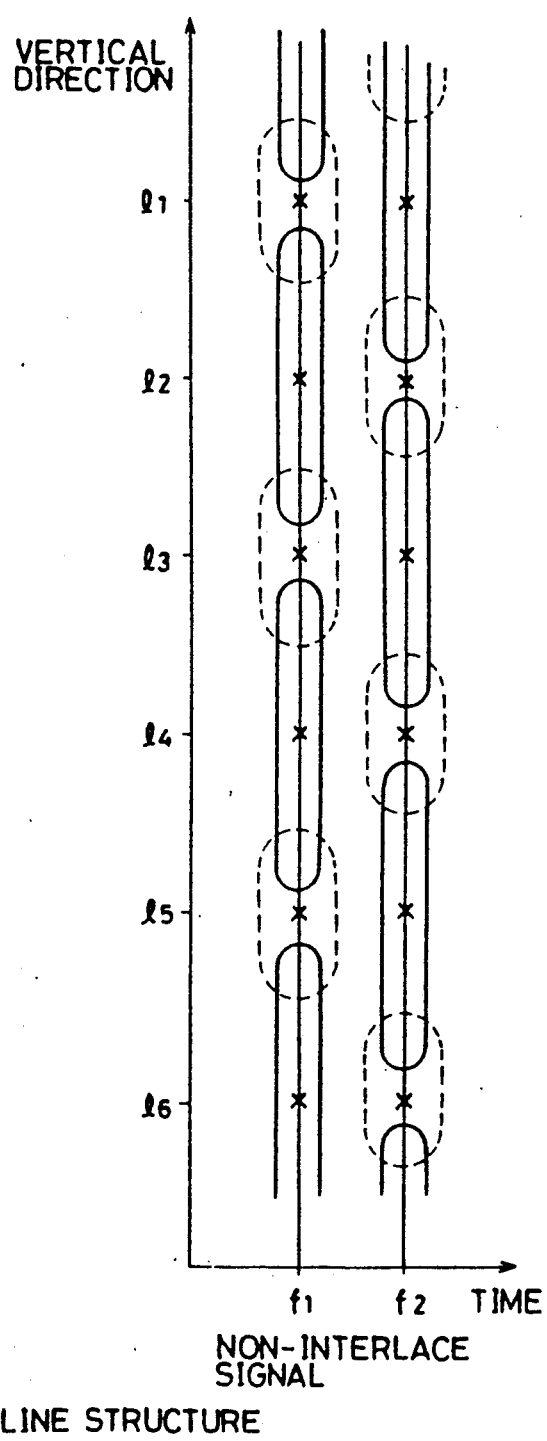

FIG. 14A is a diagram showing the video signal SVs, where "o" indicates a scanning line. FIG. 14B is a diagram showing the output non-interlace signal, where "x" indicates a scanning line. In this case, all the scanning line signals of the non-interlace signal are formed by operating a plurality of scanning line signals of the video signal SVs.

For example, the following different controls are repeated for every three lines in a field containing the frame pulse and in a field containing no such pulse.

In FIG. 16A, it is assumed now that a field f1 contains the frame pulse. In this field f1, for the 3n+0 (0, 3, 6, ...)-th lines from the frame pulse, the current scanning line signal and that of one line before, encircled together with solid line in FIG. 16A, are added with a ratio of ½ to each other to form a scanning line signal of the non-interlace signal.

For the 3n+1 (1, 4, 7, ...)-th lines, no scanning line signal of the non-interlace signal is formed.

For the 3n+2 (2, 5, 8, ...)-th lines, the current scanning line signal and those of one line and two lines before, encircled together with broken lines in FIG. 16A, are added together with a ratio of ¼, ½ and ¼, respectively, to form a scanning line signal of the non-interlace signal.

Meanwhile, in a field f2 containing no frame pulse, for the 3n+0 (9, 12, 15, ...)-th lines from the frame pulse the current scanning line signal and those of one line and two lines before, encircled with broken line in FIG. 16A, are added together with a ratio of ¼, ½ and ¼, respectively, to form a scanning line signal of the non-interlace signal.

For the 3n+1 (10, 13, 16, ...)-th lines, no scanning line signal of the non-interlace signal is formed.

Further, for the 3n+2 (11, 14, ...)-th lines, the scanning line signals of one line and two lines before, encircled together with solid line in FIG. 16A, are added with a ratio of ½ to each other to form a scanning line signal of the non-interlace signal.

Meanwhile, in FIG. 16A, "(x) (x=0 to 16)" is a scanning line.

FIG. 16B is a diagram showing the non-interlace signal formed by repeating the control described above, where "x" indicates a scanning line. In this diagram, position of each scanning line in the vertical direction is shown in registration with that in FIG. 16A to make clear to which position of the video signal SVs each scanning line corresponds.

More specifically, the non-interlace signal is formed by making operation such that a scanning line 11 of the non-interlace signal corresponds to a position 12 of the video signal SVs, a scanning line 2 of the non-interlace signal to a position 13' of the video signal SVs and so on.

While in the description above, no scanning line signal of the non-interlace signal is formed in the 3n+1-th lines of a field containing no frame pulse and a scanning line signal of the non-interlace signal is formed of the scanning line signals of one line and two lines before in the 3n+2-th lines in such a field, the scanning line signals may be formed in a different manner. For example, a scanning line signal of the non-interlace signal may be formed of the current scanning line signal and that of one line before for the 3n+1-th lines, and no scanning line signal of the non-interlace signal may be formed in the 3n+2-th lines.

When the frame pulse is inverted in phase, the processings as shown in FIG. 16A are made to form the non-interlace signal as shown in FIG. 16B. In this case, the scanning line 11 of the non-interlace signal corresponds to a position 12' of the video signal SVs, the scanning line 12 of the non-interlace signal to a position 14 of the video signal SVs and so on. Thus, when compared with the case shown in FIGS. 15A and 15B, the position of scanning lines is shifted by one line but fixed for every field. Therefore, the non-interlace signal can be formed in the same manner.

While in FIGS. 14A to 16B, the description has been made assuming the scanning line number of the video signal SVs as 17, the non-interlace signal can be formed generally in the same manner when the scanning line number is 6k+5, for example, 527, 623, 1127 and so on.

Figure 18:
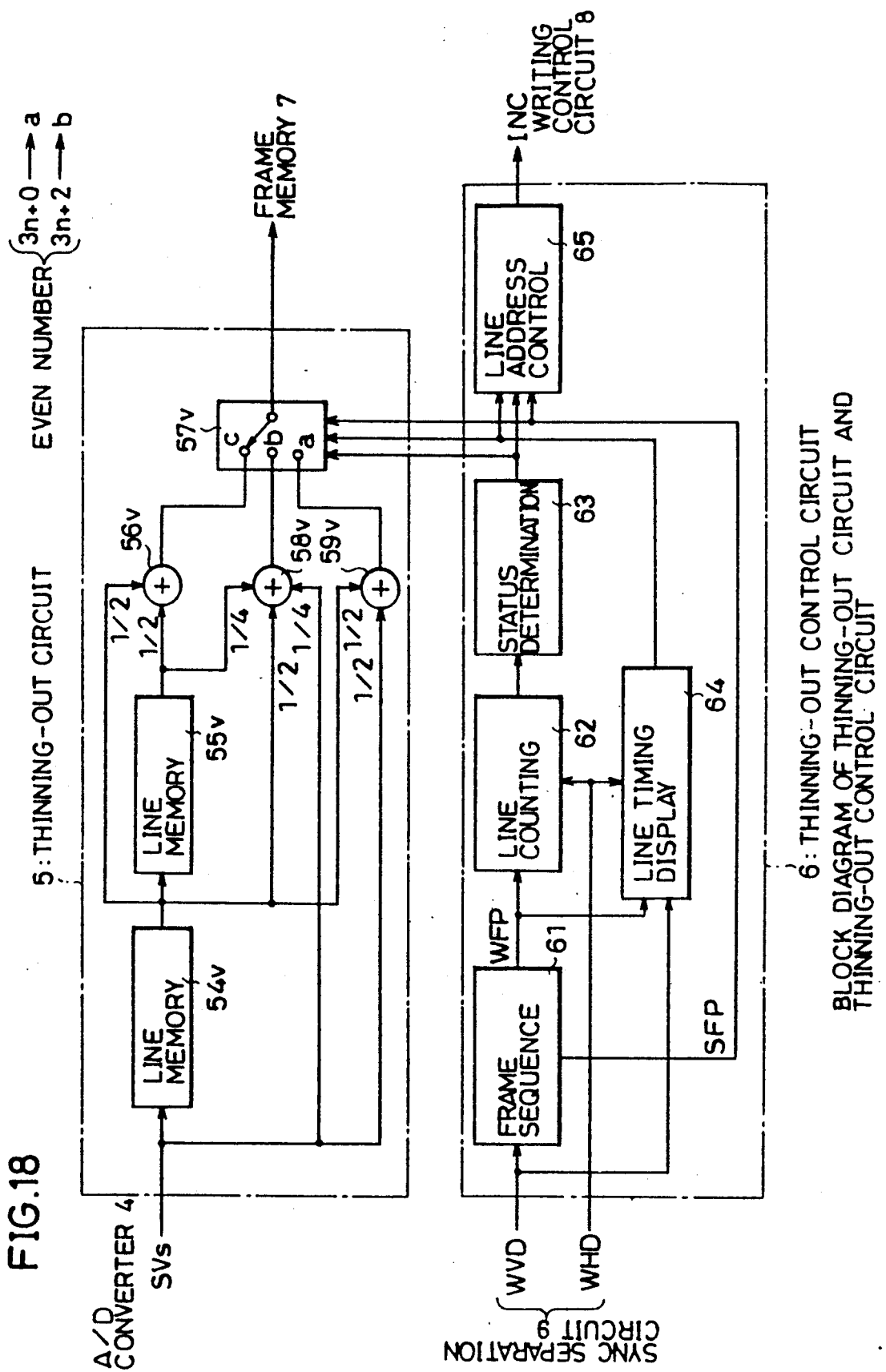
FIG. 18 is a schematic block diagram showing a thinning-out circuit and a thinning-out control circuit in the case of a ⅓ scanning line number.

FIG. 18 shows a specific structure of the thinning-out circuit 5 and the thinning-out control circuit 6 for the processings of making the scanning line number ½.

In FIG. 18, the video signal SVs from the A/D converter 4 is supplied to a series circuit of line memories 54v and 55v constituting a delay element which provides a delay time of one horizontal period. Output signals of the line memories 54v and 55v are supplied to an adder 56v to be added with a ratio of ½ to each other before supplied to a fixed terminal on c side of a selector switch 57v. Further, the video signal SVs from the A/D converter 4, and the output signals from the line memories 54v and 55v are supplied to another adder 58v to be added together with a ratio of ¼, ½ and ¼, respectively, before supplied to another fixed terminal on b side of the selector switch 57v. The video signal SVs from the A/D converter 4 and the output signal of the line memory 54v are also supplied to another adder 59v to be added with a ratio of ½ to each other before supplied to another fixed terminal on a side of the selector switch 57v.

In the status determining circuit 63 in the thinning-out control circuit 6, it is determined under which group among those of even number, 6k+1, 6k+3 and 6k+5 the scanning line number falls. That is, a determination is made, based on the line number data for one frame from the line counter circuit 62, as to whether the line number is even or not, and at the same time, if it is odd, the remainder of division by 6 is found. This status determining circuit 63 can be constituted of hardware, but may be simply implemented by an ROM.

Supposing that the standard scanning line number is about 525, the capacity of such as ROM is 2K bits as will be described below. First, it requires 10 bits to supply the line number data to addresses in the ROM. Further, the status, which has four types in total, can be represented with two bits. Accordingly, the capacity of the ROM is:

$$2^{10} \times 2 = 2K \text{ bits.}$$

In the line timing display circuit 64 of the thinning-out control circuit 6, the number of the present line from the frame pulse WFP or the vertical synchronizing signal WVD is counted and the resulting value is divided by 3 to output the remainder. The other structure of those circuits is configured in the same manner as in FIG. 8.

The signal SFP of the frame sequence circuit 61, the determination signal of the status determining circuit 63 and the output signal of the timing display circuit 64 are supplied to the selector switch 57v of the thinning-out circuit 5 and also to the line address control circuit 65 to control switching of the selector switch 57v and thus signal output from the same.

More specifically, when the scanning line number in one frame is even, the following control is executed. For the 3n+0-th lines in each field, the selector switch 57v is put on the a side and at the same time, the increment signal INC is outputted from the line address control circuit 65 allowing output of a signal from the selector switch 57v. For the 3n+1-th lines, the selector switch 57v is suspended in state and at the same time, the increment signal INC is not outputted from the line address control circuit 65, inhibiting output of any signal. Further, for the 3n+2-th lines, the selector switch 57v is put on the b side and at the same time, the increment signal INC is outputted from the line address control circuit 65, allowing output of a signal from the selector switch 57v.

When the scanning line number in one frame is 6k+1, the following control is executed. When a field contains the frame pulse, for the 3n+0-th lines from the frame pulse, the selector switch 57v is put on the b side and at the same time, the increment signal is outputted from the line address control circuit 65 to allow output of a signal from the selector switch 57v. For the 3n+1-th lines from the frame pulse, the selector switch 57v is suspended in state and no increment signal INC is outputted from the line address control circuit 65, inhibiting output of any signal. Further, for the 3n+2-th lines, the selector switch 57v is put on the c side and the increment signal INC is outputted from the line address control circuit 65 to allow output of a signal from the selector switch 57v.

On the other hand, when a field does not contain any frame pulse, for the 3n+0-th lines from the frame pulse, the selector switch 57v is put on the a side and the increment signal INC is outputted from the line address control circuit 65 to allow output of a signal from the selector switch 57v. For the 3n+1-th lines from the frame pulse, the selector switch 57v is suspended in state and no increment signal INC is outputted from the line address control circuit 65, inhibiting output of any signal. For the 3n+2-th lines, the selector switch 57v is put on the b side and the increment signal INC is outputted from the line address control circuit 65 to allow output of a signal from the selector switch 57v.

Meanwhile, in a field containing the frame pulse, the following control may be executed. For the 3n+0-th lines from the frame pulse, the selector switch 57v is put on the b side and the increment signal is outputted from the line address control circuit 65 to allow output a signal from the selector switch 57v. For the 3n+1-th lines from the frame pulse, the selector switch 57v is put on the a side and the increment signal INC is outputted from the line address control circuit 65 to allow output of a signal from the selector switch 57v. For the 3n+2-th lines from the frame pulse, the selector switch 57v is suspended in state and no increment signal INC is outputted from the line address control circuit 65, inhibiting output of any signal.

Further, when the scanning line number in one frame is 6k+3, the following control is executed. For the 3n+0-th lines from the frame pulse, the selector switch 57v is put on the a side and the increment signal INC is outputted from the line address control circuit 65 to allow output of a signal from the selector switch 57v. For the 3n+1-th lines from the frame pulse, the selector switch 57v is suspended in state and no increment signal INC is outputted from the line address control circuit 65, inhibiting output of any signal. For the 3n+2-th lines, the selector switch 57v is put on the b side and the increment signal INC is outputted from the line address control circuit 65 to allow output of a signal from the selector switch 57v.

Further, when the scanning line in one frame is 6k+5, the following control is executed. When a field contains the frame pulse, for the 3n+0-th lines from the frame pulse, the selector switch 57ν is put on the a side and the increment signal is outputted from the line address control circuit 65 to allow output of a signal from the selector switch 57ν. For the 3n+1-th lines from the frame pulse, the selector switch 57ν is suspended in state and no increment signal INC is outputted from the line address control circuit 65, inhibiting output of any signal. For the 3n+2-th lines, the selector switch 57ν is put on the b side and the increment signal INC is outputted from the line address control circuit 65 to allow output of a signal from the selector switch 57ν. Meanwhile, when a field does not contain any frame pulse, for the 3n+0-th lines from the frame pulse, the selector switch 57ν is put on the b side and the increment signal INC is outputted from the line address control circuit 65 to allow output of a signal from the selector switch 57ν. For the 3n+1-th lines from the frame pulse, the selector switch 57ν is suspended in state and no increment signal INC is outputted from the line address control circuit 65, inhibiting output of any signal. For the 3n+2-th lines, the selector switch 57ν is put on the c side and the increment signal INC is outputted from the line address control circuit 65 to allow output of a signal from the selector switch 57ν.

Meanwhile, in a field containing no frame pulse, the following control may be executed. That is, for the 3n+0-th lines from the frame pulse, the control switch 57ν is put on the b side and the increment signal INC is outputted from the line address control circuit 65 to allow output of a signal from the selector switch 57ν. For the 3n+1-th lines from the frame pulse, the selector switch 57ν is put on the a side and the increment signal INC is outputted from the line address control circuit 65 to allow output of a signal from the selector switch 57ν. For the 3n+2-th lines from the frame pulse, the selector switch 57ν is suspended in state and no increment signal INC is outputted from the line address control circuit 65, inhibiting output of any signal.

Thirdly, description will be made on the case where the scanning line number is $\frac{1}{4}$.

In this case, the discussion developed for the scanning line number of $\frac{1}{2}$ is applicable. That is, since the scanning line number of $\frac{1}{2}$ only needs to be made further $\frac{1}{2}$, a non-interlace signal is first formed under the same control for the scanning line number of $\frac{1}{2}$ and then arithmetic mean is obtained from every two lines to make the scanning line number $\frac{1}{4}$.

Thus, the thinning-out circuit 5 and the thinning-out control circuit 6 for the processings in the case of the scanning line number of $\frac{1}{4}$ are configured with an additional circuit for obtaining arithmetic mean from every two lines, which is provided, for example, in the subsequent stage of the selector switch 51ν shown in FIG. 8. Such a structure allows formation of a good non-interlace signal even in the case of the scanning line number of $\frac{1}{4}$.

In this manner, the circuit shown as an example in FIG. 8 can be used for both of the scanning line numbers $\frac{1}{2}$ and $\frac{1}{4}$.

Meanwhile, in the case of the scanning line number $\frac{1}{4}$, the non-interlace signal may be obtained by directly reducing the line number to $\frac{1}{4}$ as in the case of $\frac{1}{2}$.

As has been described above, whatever signal the video signal SVs may be, a non-interlace signal can be formed with the thinning-out circuit 5 if only the scanning line number is any of $\frac{1}{2}$, $\frac{1}{3}$ and $\frac{1}{4}$.

Furthermore, with the use of the same structure as described above, a complete non-interlace signal can be formed also in other cases where the scanning line number meets the relationship of $\frac{1}{2}$n or $\frac{1}{3}$n (n is natural number).

In the control described above, the non-interlace signal can be formed in a good condition irrespective of phase of the frame pulse. This means that the control may start with any field, whether it is even or odd. As a result, without making field determination of the video signal SVs in writing, an interlace signal can be converted into a non-interlace signal.

When the reference video signal SVm is an NTSC signal and the video signal SVs is a high-resolution TV signal as in the present embodiment, however, the scanning line number of $\frac{1}{3}$ may be desirably employed. This is due to difference in the aspect ratio between the NTSC and the high-resolution TV.

When a high-resolution TV picture of an aspect ratio of about 5:3 is projected onto an NTSC monitor of an aspect ratio of 4:3 with their breadths matched, the number of effective scanning lines in the picture is about 380. With the use of a scanning line number converting device which makes scanning line number $\frac{1}{3}$, a non-interlace high-resolution TV signal with 375 scanning lines per field can be obtained.

Therefore, the scanning line number of $\frac{1}{3}$ is desirable.

Turning back to FIG. 4, writing operation of the scanning line signals into the frame memory 7 will be described. Each scanning line signal of the non-interlace signal outputted from the thinning-out circuit 5 is written in the frame memory 7.

As described above, field determination of the video signal SVs is not made in the writing so that when the video signal SVs is an interlace signal, there is no specifying which field of the signal is written in which field portion of the frame memory 7. Since the output signal of the thinning-out circuit 5 itself is a non-interlace signal, however, the conception of even and odd fields is unnecessary for the frame memory 7 and thus leads to no problem.

A passing determination circuit 11 examines, based on MSB data of line addresses from the writing control circuit 8 and the reading control circuit 12 as will be described later, to which field portion in the frame memory 7 writing and reading are being applied, respectively, and outputs an inverting signal INV to invert a writing field. The inverting signal INV is supplied to the writing control circuit 8 to invert a field in the writing so that writing and reading may not be simultaneously applied to the same field portion in the frame memory 7.

Besides the synchronizing signals WHD and WVD described above, the writing control circuit 8 receives a writing clock WCK' from the thinning-out circuit 5, the increment signal INC for line address from the thinning-out control circuit 6, and the inverting signal INV from the passing determination circuit 11, and based on those signals, forms a writing address for the frame memory 7.

Figure 19:
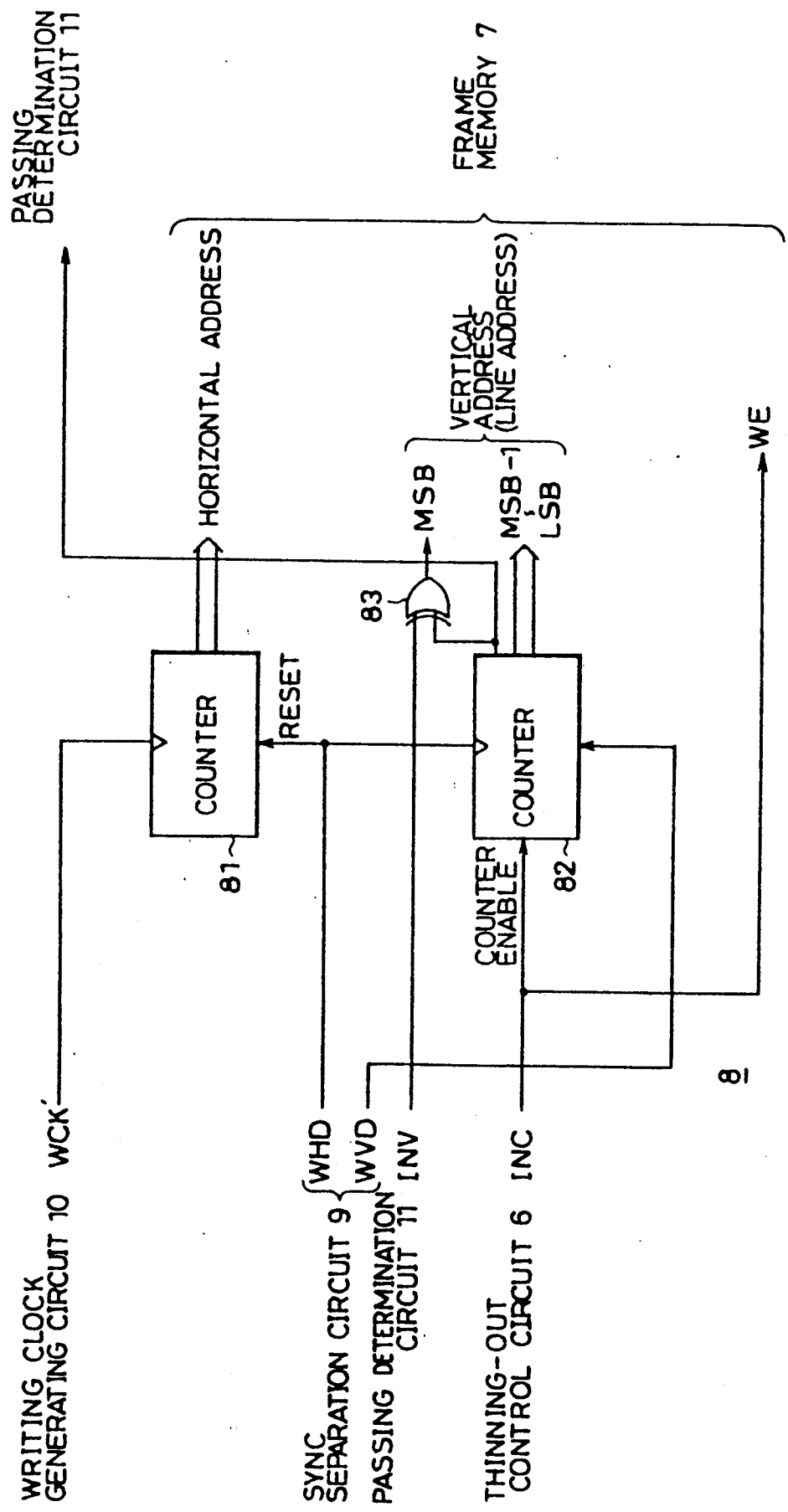
FIG. 19 is a block diagram showing the writing control circuit shown in FIG. 4.

FIG. 19 is a block diagram showing a specific structure of the writing control circuit 8.

In FIG. 19, a writing clock WCK from a writing clock generating circuit 10 is supplied to a counter 81 which also receives the horizontal synchronizing signal WHD from the sync separation circuit 9 as a reset signal. The count output of this counter 81 is supplied to the frame memory 7 as a horizontal address.

Further, the horizontal synchronizing signal WHD from the sync separation circuit 9 is supplied to another counter 82 as clock, which also receives the vertical synchronizing signal WVD from the sync separation circuit 9 as a reset signal. This counter 82 also receives the increment signal INC from the thinning-out control circuit 6 as a counter enable signal. Count outputs MSB−1 to LSB of the counter 82 are supplied to the frame memory 7 as MSB−1 to LSB of a line address (vertical address).

The count output MSB of the counter 82 is supplied to one input terminal of an EXOR circuit 83 which receives the inverting signal INV from the passing determination circuit 11 at the other input terminal. An output signal of the EXOR circuit 83 is supplied to the frame memory 7 as MSB of the line address.

In this case, when the inverting signal INV is supplied from the passing determination circuit 11, the output signal of the EXOR circuit 83, or MSB status of the line address is inverted, thereby inverting a field in the writing. Further, when the increment signal INC is supplied from the thinning-out control circuit 6, the counter 82 is put in the countable state and increments the line address. At this time, a write enable signal WE is supplied to the frame memory 7 so that the frame memory 7 is put in the writable state.

The count output MSB of the counter 82 is supplied to the passing determination circuit 11 to be compared with a reading line address for formation of the inverting signal INV, as will be described later.

While in the writing control circuit 8 shown in FIG. 19, the frame memory 7 is configured using a standard RAM, the frame memory 7 may be implemented more simply with the use of an IC specific to field memory.

Figure 20:
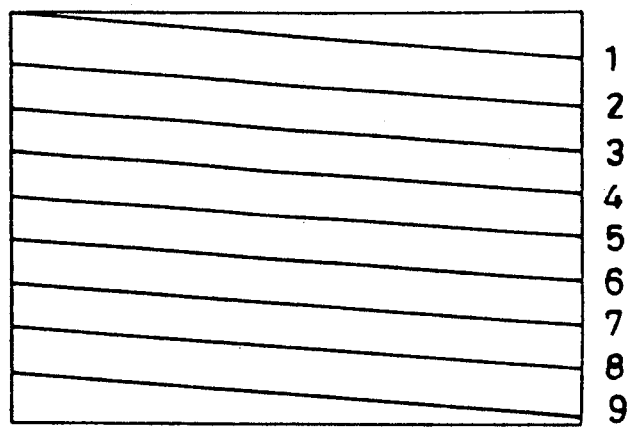
FIG. 20 is a diagram showing a written state of the frame memory.

According to writing addresses formed in the writing control circuit 8 as described above, the non-interlace signal is written in each field of the frame memory 7 as shown in FIG. 20. FIG. 20 shows one field containing, for simplicity, 9 lines.

Reading operation of the non-interlace signal written in the frame memory 7 in this manner will be described below.

In FIG. 4, a clock generating circuit 13 is configured using a PLL circuit and the like. The frequency of a reading clock RCK generated in this clock generating circuit 13 has influence on the horizontal length of a displayed picture.

This frequency is determined taking aspect ratios of a high-resolution TV picture and the NTSC television monitor, and the like into consideration. For example, it may be set equal to or an appropriate constant times the frequency of the writing clock WCK for the frame memory 7. At this time, the frame memory 7 operates as time base changing means such that writing and reading are executed asynchronously.

In reading from the frame memory 7, the video signal SVm is used as reference. The video signal SVm is supplied to a sync separation circuit 14 through the input terminal 1, where the vertical and horizontal synchronizing signals RVD and RHD are separated.

Further, the video signal SVm is supplied to a monitoring receiver 18 to mask its screen during a period when a down-converted high-resolution TV signal is not applied to the monitoring receiver 18 through a fixed terminal on s side of a selector switch 2.

As previously described, since a down-converted high-resolution TV signal has only about 375 scanning lines, no high-resolution TV signal exists during a period for the remaining number of scanning lines of the NTSC monitor, which is obtained by subtracting the scanning line number of the high-resolution TV signal from that of the NTSC monitor, or 525. Only during this period, therefore, a picture formed of the video signal SVm is projected on the screen of the monitoring receiver 18, masking unnecessary portions on the screen.

When a signal for masking is to be generated separately, the input terminal 1 and the sync separation circuit 14 in FIG. 4 may be removed and RHD and RVD may be directly generated.

Meanwhile, in reading signals from the frame memory 7, either of the interlacing manner and the non-interlacing manner may be employed. The frame memory 7 has signals written in the non-interlaced state. When the signals are read out in the non-interlacing manner, therefore what is required is only to read them out sequentially using RHD and RVD and no other complicated control is necessary.

In the following, a structure for reading out interlaced signals will be described.

In reading interlaced signals, the synchronizing signals RVD and RHD are supplied to a field determination circuit 15. In the field determination circuit 15, determination is made, based on phase of the synchronizing signals RVD and RHD, as to whether the reference signal SVm is in an even or odd field. For example, as shown in FIGS. 21A and 21B, when the horizontal synchronizing signal RHD and the vertical synchronizing signal RVD correspond in phase to each other in one field, it is determined that the field is odd. On the other hand, as shown in FIGS. 21C and 21D, when the horizontal synchronizing signal RHD and the vertical synchronizing signal RVD are shifted in phase from each other only by a ½ horizontal period (H/2) in one field, it is determined that the field is even. In this case, it is assumed that the scanning line of an even field lies above the corresponding one of an odd field, as shown in FIG. 22. Meanwhile, FIG. 22 shows a case where one frame contains 9 lines.

A determination signal FD from the field determination circuit 15 is supplied to a reading control circuit 16. The reading control circuit 16 also receives the synchronizing signals RVD and RHD separated in the sync separation circuit 14 and the reading clock RCK from the clock generating circuit 13. Reading addresses for the frame memory 7 are formed based on these signals and the non-interlace signal written in the frame memory 7 is converted into an interlace signal corresponding to an interlace sequence of the reference video signal SVm and then read out.

Figure 21:
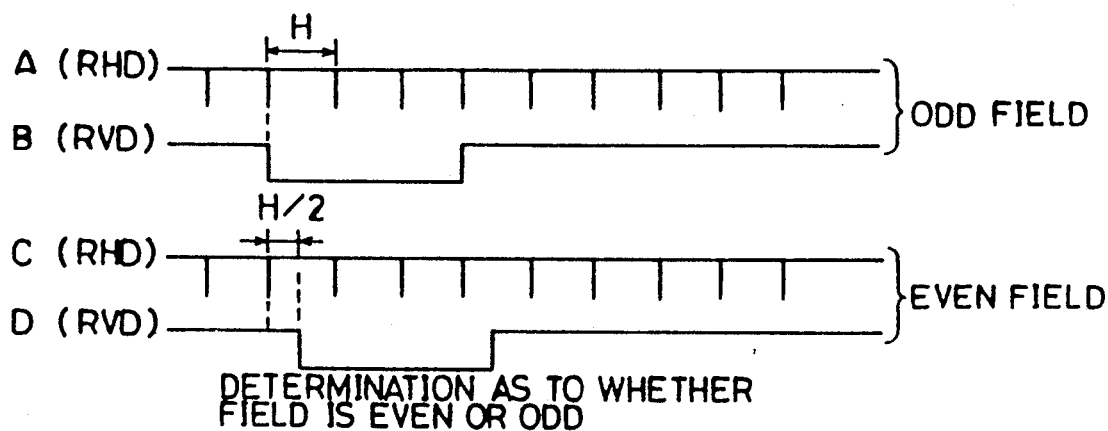
FIGS. 21 and 22 are diagrams for explaining an operation of determining whether a field is even or odd.
Figure 22:
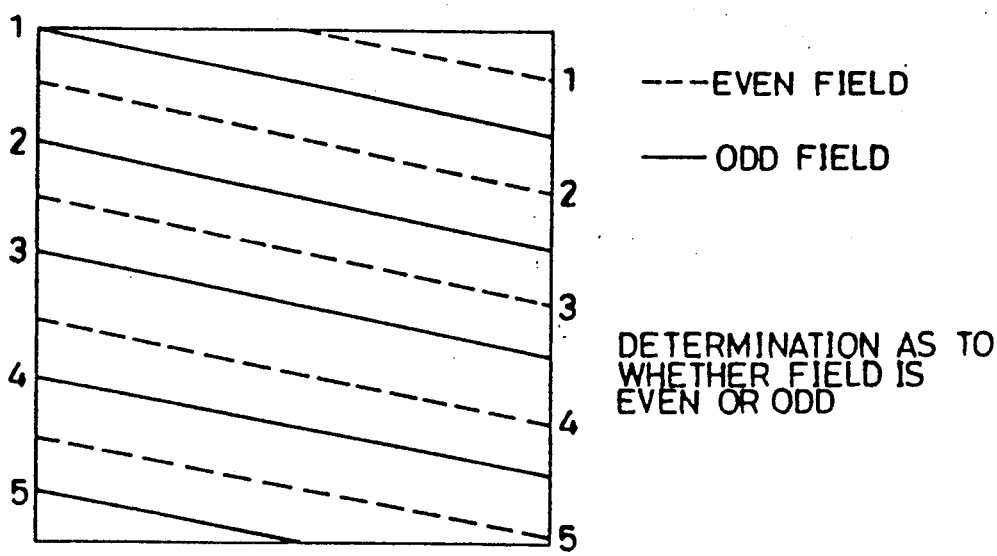

It is to be noted here that in the frame memory 7, the scanning line signal corresponding to the first line of an even field is not written in, as shown in FIG. 21.

More specifically, to make the interlace signal match with the interlace sequence of the video signal SVm, it is required in odd fields to read out scanning line signals of 1, 3, 5, ... in FIG. 20 and in even fields to read out scanning line signals of 2, 4, 6, ... In this case, since the frame memory 7 has the non-interlace signal of two fields written therein, whichever field portion may be allotted to any field of the video signal SVm. Therefore, the signals is read in the manner described above out of either of the two field portions in the frame memory 7 alternately, according to the determination results as to field of the video signal SVm.

Figure 23:
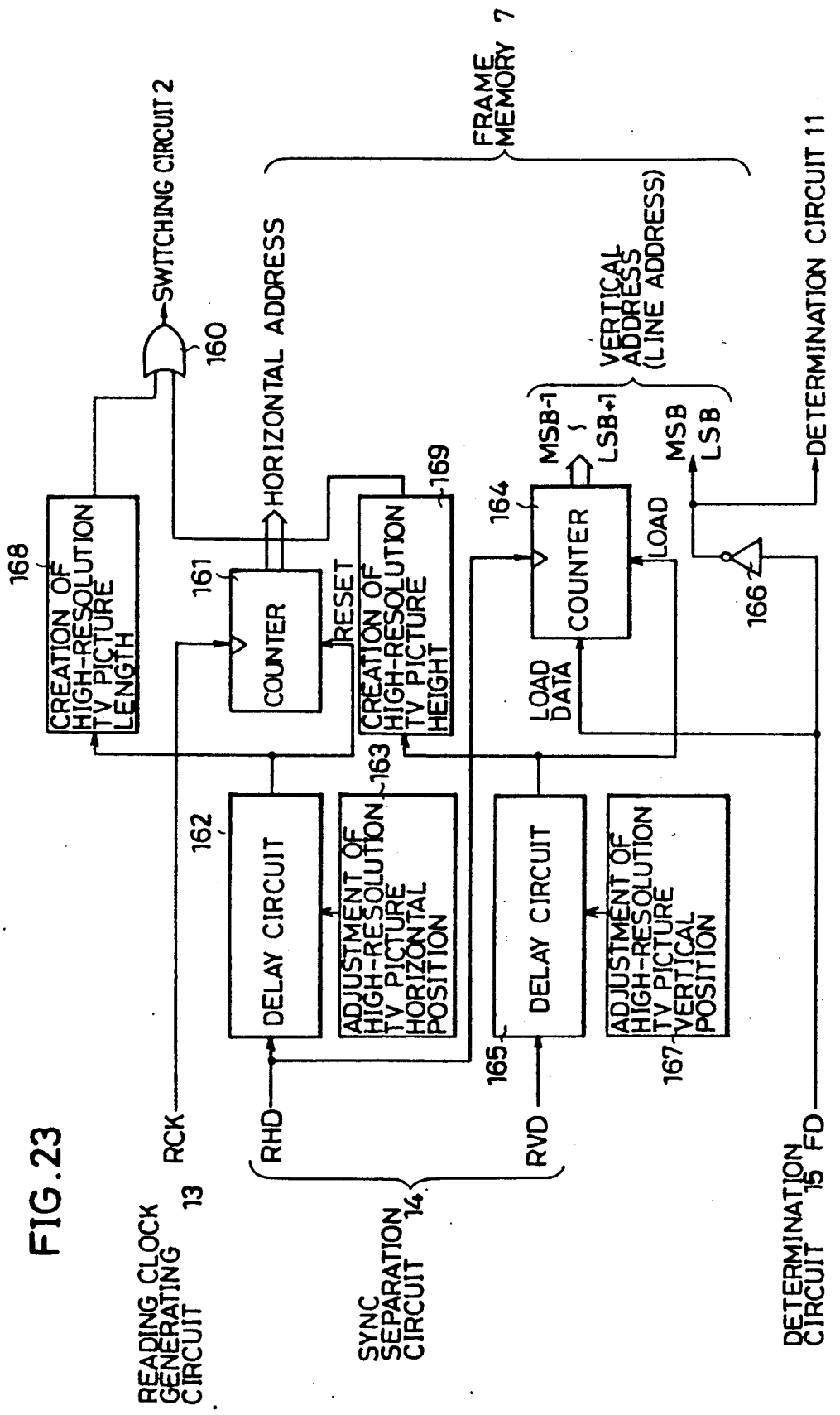
FIG. 23 is a schematic block diagram showing the reading control circuit shown in FIG. 4.

FIG. 23 is a block diagram showing a specific structure of the reading control circuit 16.

In FIG. 23, the reading clock RCK from the reading clock generating circuit 13 is supplied to a counter 161. The counter 161 also receives the horizontal synchronizing signal RHD from the sync separation circuit 14 through a delay circuit 162 as a reset signal. The count output of this counter 161 is supplied to the frame memory 7 as a horizontal address.

In this case, the horizontal synchronizing signal RHD is delayed only by a time set in a horizontal position adjusting circuit before supplied to the counter 161 to reset it. That is, a horizontal reading in the frame memory 7 is started at the timing of this reset and a display starting point in the horizontal direction is determined.

Meanwhile, the reading control circuit 16 is adapted such that a delay amount is adjusted using one cycle of the reading clock RCK as unit, for example. As the delay amount becomes larger, the display position on the screen is set closer to the right side.

The horizontal synchronizing signal RHD from the sync separation circuit 14 is supplied to another counter 164 as clock. The counter 164 also receives the vertical synchronizing signal RVD from the sync separation circuit 14 through the delay circuit 162 as a load signal. Further, the field determination signal FD from the field determination circuit 15 is supplied to the counter 164 as LSV of load data. The other bits of the load data is set, for example, to the low level "0". While not previously described, the field determination signal FD takes, for example, the low level "0" in an odd field and the high level "1" in an even field. Count outputs of the counter 164 are supplied to the frame memory 7 as MSB−1 to LSB+1 of a line address (vertical address).

Further, the field determination signal FD from the field determination circuit 15 is supplied to an inverter 166 output signals of which are supplied to the frame memory 7 as MSB and LSB of the line address.

In this case, since status of MSB of the line address changes depending on the field determination signal FD, reading is executed alternately in the two field portions of the frame memory 7 according to whether the video signal SVm is in an odd or even field.

In case of an odd field, the lower-rank two bits of the line address initially become "01" and LSB is fixed to "1" so that the scanning line signals of 1, 3, 5, ... are sequentially read out. On the other hand, in case of an even field, the lower-rank two bits of the line address initially become "10" LBS is fixed to "0" so that the scanning line signals of 2, 4, 6, ... are sequentially read out.

Also in this case, the vertical synchronizing signal RVD is delayed only by time set in a vertical position adjusting circuit 167 before supplied to the counter 164 to allow loading of load data therein. That is, a vertical reading in the frame memory 7 is started at the timing of this loading, determining a display starting point in the vertical direction of the screen.

The horizontal synchronizing signal RHD delayed by the delay circuit 162 is supplied to a high-resolution TV picture length creating circuit 168, from which a signal is outputted that attains, for example, the high level "1" only during a period when a picture is displayed at the timings of the horizontal synchronizing signal RHD and falls down to the low level "0" for the other periods. The output signal of the creating circuit 168 is supplied to an OR circuit 160.

The vertical synchronizing signal RVD delayed by the delay circuit 165 is supplied to a high-resolution TV picture height creating circuit 169, from which a signal is outputted that attains, for example, the high-level "1" only during a period when a picture is displayed at the timings of the vertical synchronizing signal RVD and falls down to the low level "0" for the other periods. The output signal of the creating circuit 169 is supplied to the OR circuit 160.

Further, MSB of the reading line address outputted from the inverter 166 is supplied to the passing determination circuit 11.

While not previously described, the passing determination circuit 11 constantly monitors MSBs of the reading line address and the writing line address (output of the counter 82) and when they have the same polarity, outputs an inverting signal INV of the high level "1" to invert a writing field.

While in the reading control circuit 16 shown in FIG. 23, the frame memory 7 is implemented as a standard RAM, it may be configured more simply with the use of an IC specific to field memory.

Turning now back to FIG. 4, the video signal for high-resolution TV picture read out of the frame memory 7 in the manner described above are converted into an analog signal by a D/A converter 17 before supplied to the fixed terminal on the s side of the selector switch 2. The selector switch 2 also receives an output signal of the OR circuit 160 in the reading control circuit 16 as a switching control signal. The selector switch 2 is put on the s side when the output signal of the OR circuit 160 is of the high level "1", while put on the m side when it is of the low level "0". As described above, the output signal of the OR circuit 160 is at the high level "1" for a display period of high-resolution TV picture. Only during this period, the selector switch 2 is put on the s side so that the video signal for high-resolution TV picture read out of the frame memory 7 is inserted into the reference video signal SVm.

Further, the output signal of the selector switch 2 is supplied to the monitoring receiver 18, where a high-resolution TV picture is projected in good condition, in place of an NTSC picture, according to the video signal inserted into the reference video signal SVm.

The monitoring receiver 18 may be implemented by a receiver compatible with IDTV, EDTV or the like (for example, see "A high-resolution TV with digital technology, highly expected as a pillow of the next generation domestic electrification" in "Nikkei Electronics", Sept. 8, 1986) as well as an existing television receiver. In the former case, higher picture quality can be expected when a signal is read out in the non-interlacing manner using RHD and RVD, and supplied to the monitoring receiver 18 as described above.

Subsequently, description will be made on a picture-in-picture television using the scanning line number converting device. In the picture-in-picture television, it is necessary to reduce sampling rates in the vertical and horizontal directions according to a display area ratio between of sub-picture with respect to the main picture. For the vertical direction, the scanning lines are thinned out, while for the horizontal direction, sampled picture element signals are thinned out.

Figure 24:
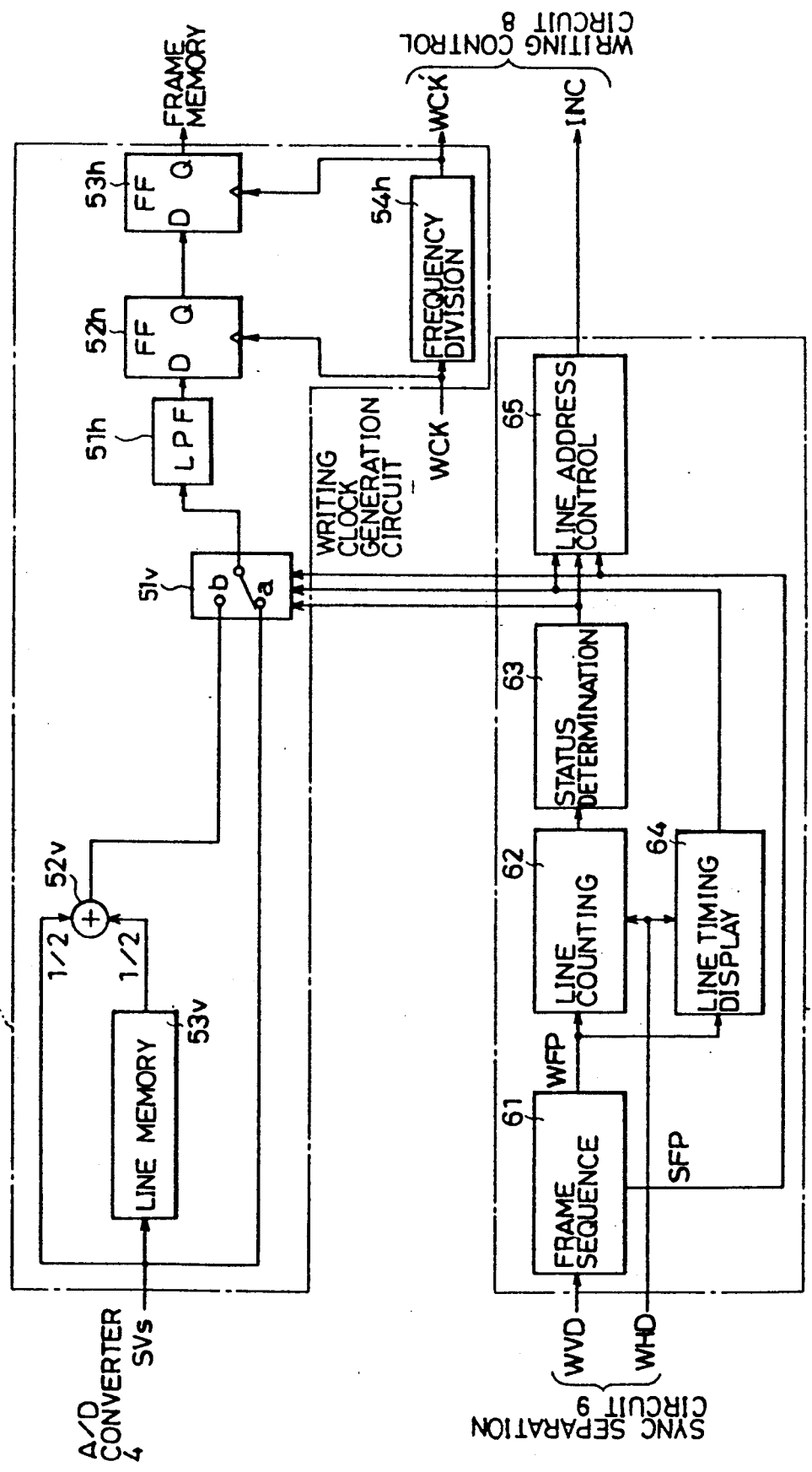
FIG. 24 is a schematic block diagram showing a thinning-out circuit and a thinning-out control circuit in a picture-in-picture television in the case of a ½ scanning line number.
Figure 25:
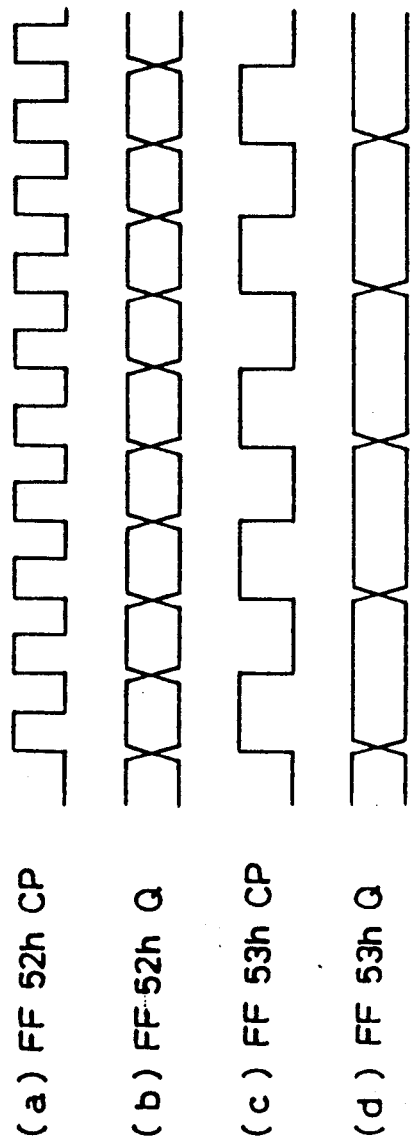
FIG. 25 is a timing chart for explaining operation of the thinning-out circuit shown in FIG. 24.

FIG. 24 is a block diagram showing a thinning-out circuit and a thinning-out control circuit which are adapted to thin out not only scanning lines but also sampled picture elements in the horizontal direction. FIG. 25 is a timing chart for explaining the picture elements thinning-out operation in the horizontal direction performed by the thinning-out circuit shown in FIG. 24.

In addition to the thinning-out circuit shown in FIG. 8, the embodiment of FIG. 24 has a low-pass filter 51h, D-type flip-flops 52h and 53h and a frequency-dividing circuit 54h provided thereto for thinning out picture elements in the horizontal direction. The low-pass filter 51h limits the output signal of the selector switch 51v in band. The signal having passed through the low-pass filter 51h is applied to D input terminal of the flip-flop 52h.

The writing clock signal WCK generated from the writing clock generating circuit 10 is applied to a clock pulse input terminal of the flip-flop 52h as shown in FIG. 25(a) and also to the frequency-dividing circuit 54h, where it is ½ frequency-divided as shown in FIG. 25(c). The thus frequency-divided clock signal WCK' is applied to a clock pulse input terminal of the flip-flop 53h and also to the writing control circuit 8. The flip-flop 52h latches output of the low-pass filter 51h in response to the writing clock signal WCK and applies its Q output to D input terminal of the flip-flop 53h as shown in FIG. 25(b). The flip-flop 53h latches the Q output of the flip-flop 52h in response to the frequency-divided writing clock signal WCK' to output a sample signal from its Q output as shown in FIG. 25(d). Therefore, the flip-flop 53h outputs from the Q output a picture element signal sampled in the horizontal direction and thinned out by half.

Figure 26:
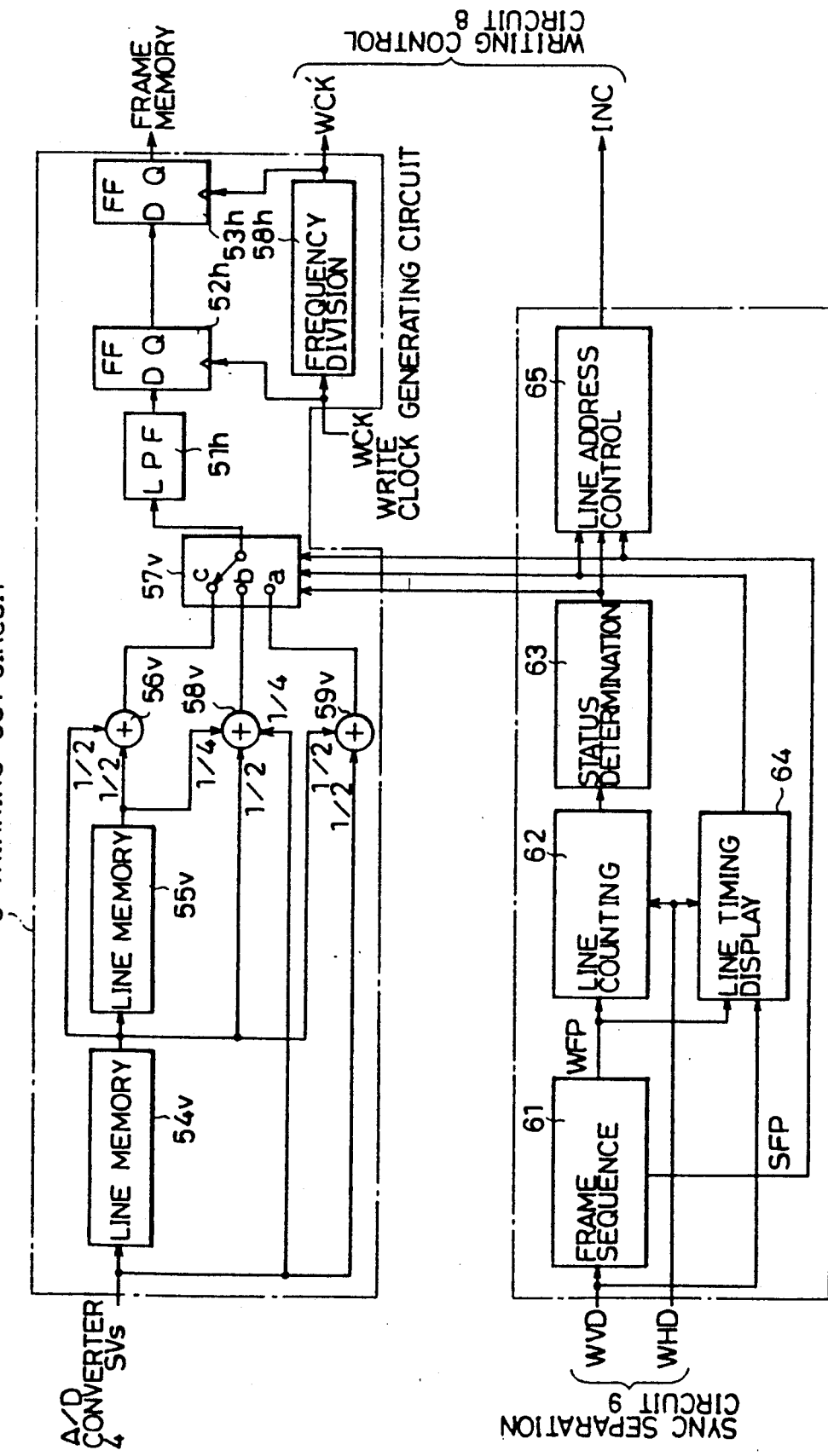
FIG. 26 is a block diagram showing a thinning-out circuit and a thinning-out control circuit in a picture-in-picture television in the case of a ⅓ scanning line number.

FIG. 26 is a block diagram of a thinning-out circuit and a thinning-out control circuit in the case of a 1/9 display area ratio. The embodiment shown in FIG. 26 is the same as that of FIG. 18 except that the sampling rate in the horizontal direction has been reduced to ⅓. To reduce the sampling rate in the horizontal direction to ⅓, a low-pass filter 51h, D-type flip-flops 52h and 53h and a frequency-dividing circuit 58h are provided. The frequency-dividing circuit 58h is for ⅓ frequency-dividing the writing clock signal WCK. In response to the ⅓ frequency-divided clock signal WCK', the flip-flop 53h latches the Q output of the flip-flop 52h so that the picture elements sampled in the horizontal direction can be reduced to ⅓.

Figure 27:
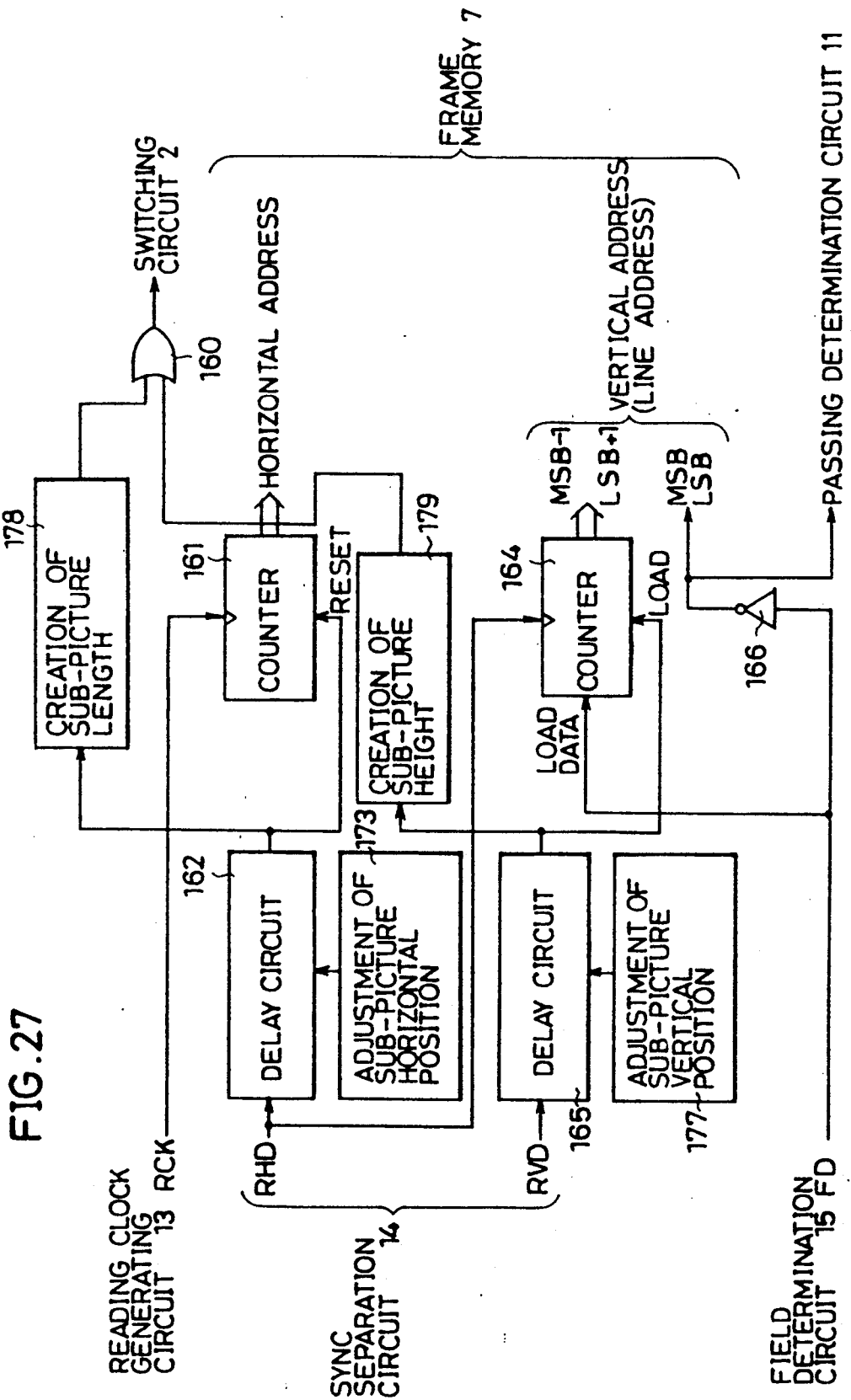
FIG. 27 is a schematic block diagram of a reading control circuit in a picture-in-picture television.

FIG. 27 is a block diagram of a reading control circuit in the picture-in-picture television. The reading control circuit shown in FIG. 27 is configured in the same manner as that of FIG. 23 except the following points. That is, the horizontal synchronizing signal RHD is delayed by a time set in a sub-picture horizontal position adjusting circuit 173 and then applied to a counter 161 to reset it. A reading of the frame memory 7 in the horizontal direction is started at the timing of this reset and a display starting position in the horizontal direction of the sub-picture is determined. Meanwhile, the reading control circuit is adapted such that the delay amount can be adjusted using, for example, one cycle of the reading clock RCK as a unit. As the delay amount becomes larger, the display position of the sub-picture is set closer to the right side.

The horizontal synchronizing signal RHD delayed by the delay circuit 162 is applied to a sub-picture length creating circuit 178. The sub-picture length creating circuit 178 outputs a signal which attains the high level "1" for a period when the sub-picture is displayed at the timings of the horizontal synchronizing signal RHD, for example, for H/2 in the case of a ¼ display area ratio and for H/3 in the case of a 1/9 display area ratio, and falls to the low level "0" for the other periods. The output signal of the sub-picture length creating circuit 178 is applied to a switching circuit 2 through an OR circuit 160.

The vertical synchronizing signal RVD delayed by the delay circuit 165 is applied to a sub-picture height creating circuit 179. The sub-picture height creating circuit 179 outputs a signal which attains the high level "1" for a period when the sub-picture is displayed at the timings of the vertical synchronizing signal RVD, for example, for a ½ field period in the case of a ¼ display area ratio and for a ⅓ field period in the case of a 1/9 display area ratio, and falls to the low level "0" for the other periods. The output signal of the sub-picture height creating circuit 179 is applied to the switching circuit 2 through the OR circuit 160. The other operations will be performed in the same manner as those by the circuit shown in FIG. 23.

In the picture-in-picture television, the video signal for the sub-picture is read out from the frame memory 7 shown in FIG. 4 and converted by the D/A converter 17 into an analog signal before supplied to the fixed terminal on the s side of the selector switch 2. the selector switch 2 receives the output signal of the OR circuit 160 in the reading control circuit shown in FIG. 27 as a switching control signal. The selector switch 2 is put on the s side when the OR circuit 160 outputs the high level signal "1", and on the m side when the OR circuit 160 outputs the low level signal "0". The output signal of the OR circuit 160 attains the high level "1" during a display period of sub-picture. Only during this period, the selector switch 2 is put on the s side, allowing the video signal for the sub-picture read out of the frame memory 7 to be inserted into the video signal SVm of the main picture.

The output signal of the selector switch 2 is applied to the monitoring receiver 18. Since for the video signal of the sub-picture inserted into the video signal SVm of the main picture, the boundary problem or the problem of incomplete interlace will not arise, as described above, the sub-picture is displayed in good condition in part of the main picture at the monitoring receiver 18.

As described above, according to the present embodiment, the video signal SVs for the sub-picture is written in each field portion of the frame memory 7 in the non-interlaced state, irrespective of whether it has been interlaced or not. The video signal for the sub-picture is then read out of the frame memory 7 while undergoing the interlace conversion such that, based on field determination results of the video signal SVm of the main picture, the video signal for the sub-picture has a proper interlace sequence with respect to the video signal SVm of the main picture.

According to the present embodiment, therefore, correspondence of interlace relationship can be always achieved between the video signal SVm of the main picture and that of the sub-picture, preventing the line flickers, double-image disturbance and the like taking place due to an erroneous field determination of the video signal SVs for the sub-picture, as has been often seen in the conventional case.

Further, according to the present embodiment, since each field of the frame memory 7 has the video signal of the sub-picture written in the non-interlaced state, it is not necessarily required to achieve a correspondence between write fields of the frame memory 7 and fields of the video signal SVs of the sub-picture. It is examined to which field of the frame memory 7 writing and reading are applied, respectively, to invert the field in writing, preventing simultaneous reading from the same field of the frame memory 7. Accordingly, the boundary problem due to an erroneous field determination of the video signal SVs for the sub-picture as in the conventional case will not occur. Therefore, it is not necessary in writing to make field determination of the video signal SVs for the sub-picture. Consequently, even when a reproduced video signal of a home video tape recorder is used as the video signal SVs for the sub-picture, the sub-picture can be displayed in good condition without bringing about degradation of picture quality due to an erroneous field determination.

As still another embodiment of the present invention, a television receiver will be described which has both functions of a high-resolution television having a down converter incorporated therein and of a picture-in-picture television. When the converter incorporated for the function of high-resolution television is also used as a signal processing circuit for the function of picture-in-picture television, it is required to change frequency of the writing clock WCK, writing and reading areas in the frame memory, and the like. The reason that the frequency of the writing clock WCK needs to be changed is that the sub-picture always has a smaller display area than the main picture. For example, when the horizontal length of the sub-picture is ⅓ of that of the main picture, the number of picture elements in the horizontal direction of the sub-picture is also ⅓ of that of the main picture.

Correspondingly, the frequency of the writing clock WCK needs to be changed. In the above-mentioned case, for example, the frequency of the writing clock WCK is set to be ⅓ of that of the reading clock RCK. Such a change can be easily realized by changing the constant of the writing clock generating circuit 10.

Subsequently, control of the writing and reading areas in the frame memory 7 will be described. As described above, when a high-resolution television is used as a picture-in-picture television, the frequency of the writing clock WCK is selected, for example, as ⅓ of that of the reading clock RCK. Further, the scanning line number converted by the scanning line number converting device also needs to be changed, according to the vertical length of the sub-picture, to ⅓ of that of the main picture. Consequently, the total picture element number of the sub-picture becomes 1/9 of that of the main picture. This means also that the number of picture elements that are in practice written in and read out of the frame memory 7 is only 1/9 of that of the main picture. That is, control is made in such a manner that only those picture elements that are required in practice are written in and read out a predetermined area of the frame memory 7. Such control is exercised by the function control portion 19 shown in FIG. 4.

Figure 28A:
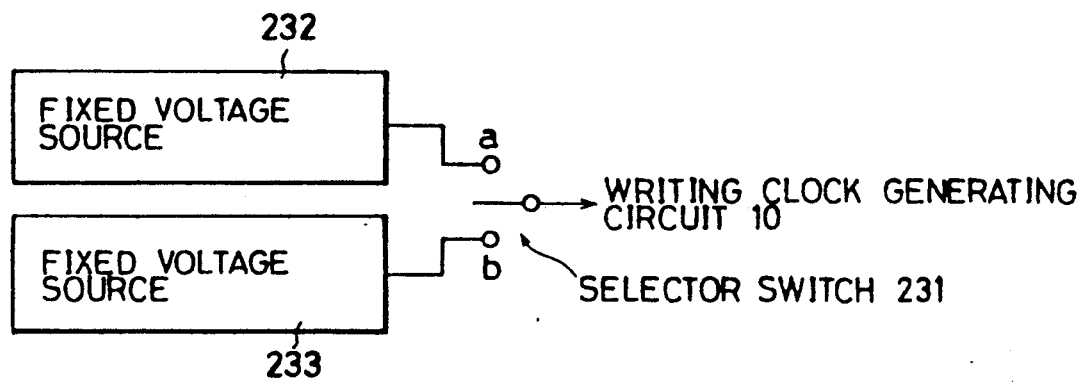
FIGS. 28A to 28C are block diagrams showing part of a function control portion.
Figure 28B:
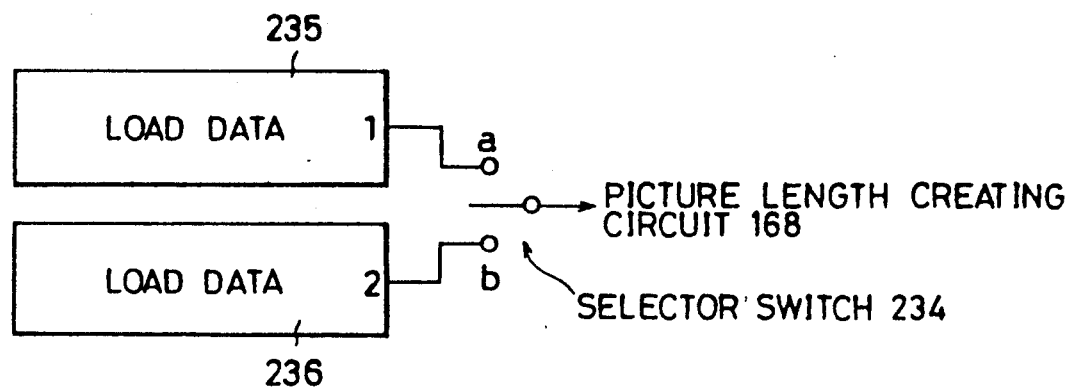
Figure 28C:
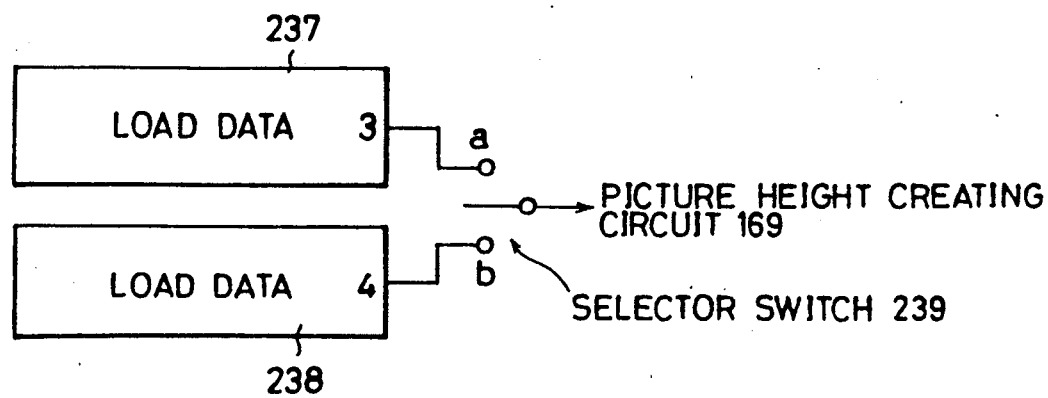

FIGS. 28A to 28C are diagrams showing part of the function control portion 19. FIG. 28A shows a structure for changing the clock frequency. The clock frequency is determined depending on structure of the writing clock generating circuit 10. It is assumed here, however, that an appropriate voltage control oscillator is used. Therefore, a selector switch 231 which can be switched according to purposes of a user, and fixed voltage sources 232 and 233 which generate fixed voltages for changing oscillation frequency are provided. An output signal of the selector switch 231 is applied to the writing clock generating circuit 10 as a control signal.

Further, then the television receiver is used as a picture-in-picture television, it is necessary to control the high-resolution TV picture length creating circuit 168, the high-resolution TV picture height creating circuit 169, the high-resolution TV picture horizontal position adjusting circuit 163 and the high-resolution TV picture vertical position adjusting circuit 167 in the reading control circuit 16 shown in FIG. 23 such that a timing of the reading from the frame memory 7 and a switching of the selector switch 2 are controlled according to position of the sub-picture. Therefore, as shown in FIGS. 28B and 28C, the function control portion 19 is provided with a function of controlling the picture length creating circuit 168 and the picture height creating circuit 169.

The picture length creating circuit 168 and the picture height creating circuit 169 are comprised of counters, which are loaded with load data 235 to 238 selected by selector switches 234 and 239. The load data 235 corresponds to picture length in the picture-in-picture television and the load data 236 corresponds to picture length in the high-resolution television. The load data 237 corresponds to picture height in the picture-in-picture television and the load data 238 corresponds to picture height in the high-resolution television.

The selector switches 231, 234 and 239 are switched in a linked manner according to purposes of a user. For example, when the television is used as a picture-in-picture television, the selector switches 231, 234 and 239 are put on the a side, and when used as a down converter, they are switched on the b side. Meanwhile, circuits for controlling the picture horizontal position adjusting circuit 163 and the picture vertical position adjusting circuit 167 are configured, for example, in the same manner as those in FIGS. 28B and 28C.

Figure 29:
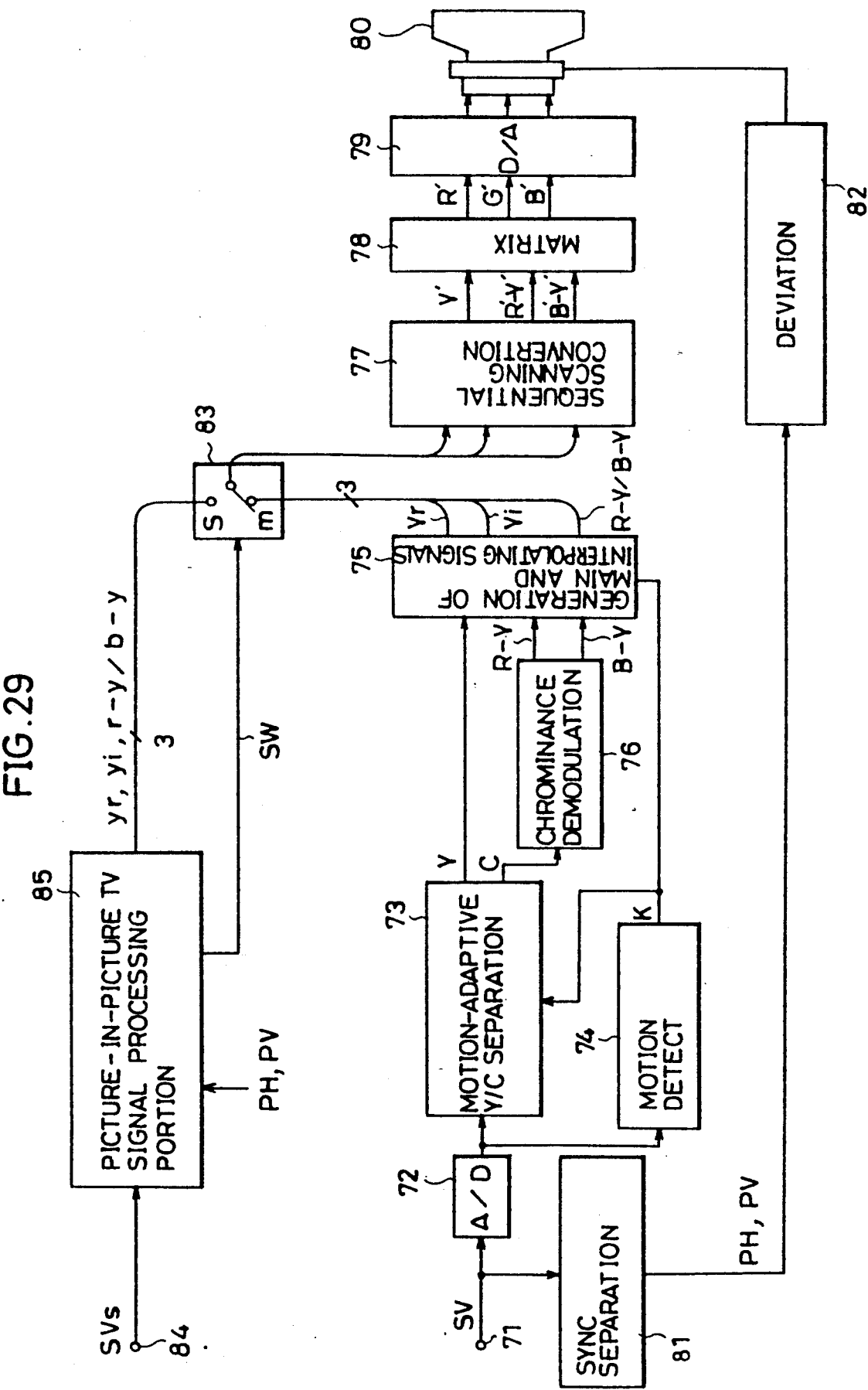
FIG. 29 is a block diagram showing structure of a picture-in-picture television according to another embodiment of the present invention.
Figure 30:
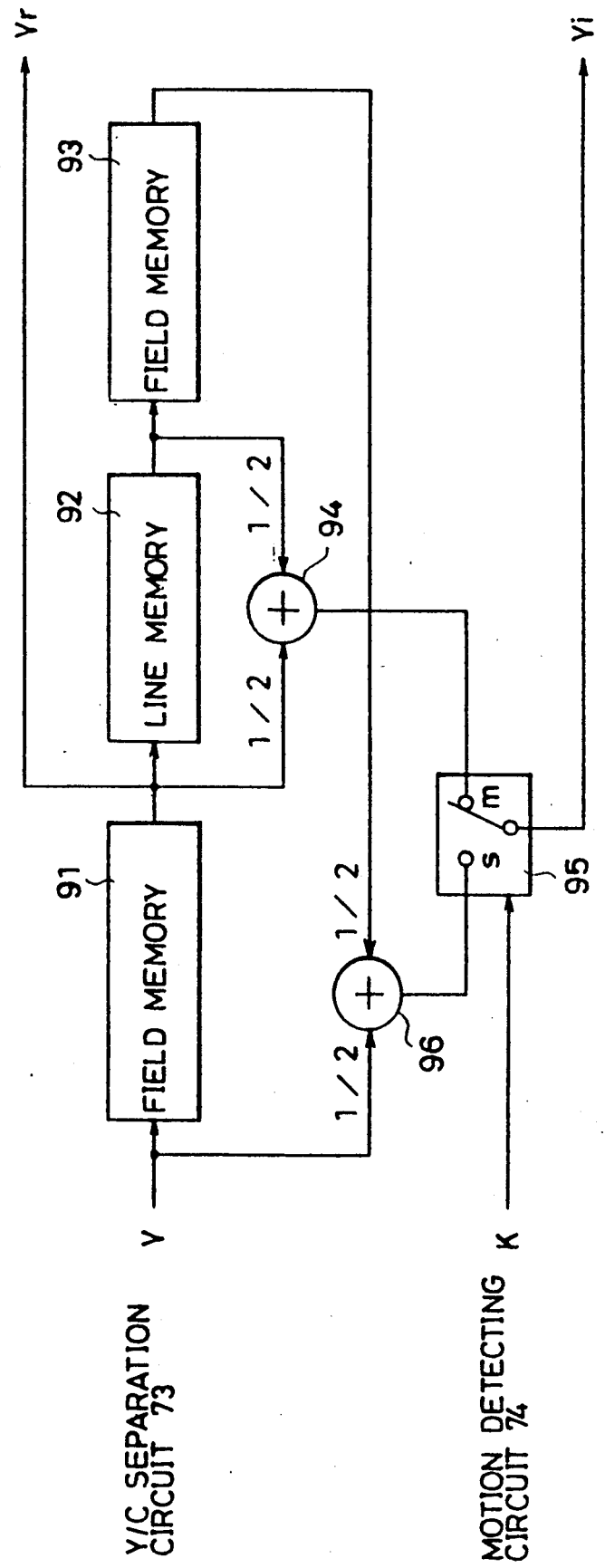
FIG. 30 is a block diagram showing an example of the main and interpolating signals generating circuit shown in FIG. 29.

FIG. 29 is a block diagram showing another embodiment of the picture-in-picture television, and FIG. 30 is a block diagram showing an example of the main and interpolating signals generating circuit shown in FIG. 29.

In FIG. 29, an input terminal 71 receives, for example, an NTSC color video signal SV, which is converted by an A/D converter 72 into a digital signal before applied to a motion-adaptive luminance signal/chrominance signal separation circuit (referred to as Y/C separation circuit hereinafter) 73. The Y/C separation circuit 73 conducts a Y/C separation through inter-line processing using a signal of one horizontal period before and conducts another Y/C separation through inter-frame processing using a signal of one frame period before.

The output signal of the A/D converter 72 is applied to a motion detecting circuit 74. The motion detecting circuit 74 outputs motion information K out of difference signals, for example, between 14 frames. The motion information K attains the high level "1" for a static picture portion and falls to the low level "0" for a moving picture portion, for example. The motion information K from the motion detecting circuit 74 is applied to the Y/C separation circuit 73, which outputs a luminance signal Y and a chrominance signal C separated through the inter-frame processing when the motion information K is at the high level "1", and outputs a luminance signal Y and a chrominance signal C separated through the inter-line processing when the motion information K is at the low level "0".

The luminance signal Y outputted from the Y/C separation circuit 73 is applied to the main and interpolating signals generating circuit 75 where an interpolate scanning line signal is formed of a main scanning line signal of the luminance signal Y. The interpolate scanning line signal is formed through field line processing and the inter-field processing. In the field line processing, for example, a mean value between the main scanning line signals of adjacent upper and lower lines in the same field is taken as an interpolate scanning line signal. On the other hand, in the inter-field processing, for example, a mean value between main scanning line signals in the same vertical position of two successive fields is taken as an interpolate scanning line signal.

Subsequently, referring to FIG. 30, the main and interpolating signals generating circuit 75 will be described. In FIG. 30, there is shown only a part of the circuit which handles the luminance signal. The luminance signal Y from the Y/C separation circuit 73 is applied to a series circuit of a field memory 91 constituting a delay element which provides a delay time of one field period (262 horizontal periods), a line memory 92 constituting a delay element which provides a delay time of one horizontal period, and a field memory 93 constituting a delay element which provides a delay time of one field period (262 horizontal periods). Output signals of the field memory 91 and the line memory 92 are added together and then their mean is taken by an adder 94. The resulting addition mean signal is applied to one fixed terminal m of a selector switch 95 as an interpolate scanning line signal obtained through the field line processing.

The luminance signal Y from the Y/C separation circuit 73 and the output signal of the field memory 93 are added and their mean is obtained by the adder 94. The addition mean signal is applied to the other fixed terminal s of the selector switch 95 as an interpolate scanning line signal obtained through the inter-field processing. The selector switch 95 receives the motion information K from the motion detecting circuit 74 and is put on the side of the fixed terminal s for a static picture portion with the motion information K at the high level "1", and to the side of the fixed terminal m for a moving picture portion with the motion information K at the low level "0". More specifically, when the motion information K is at the high level "1", the interpolate scanning line signal formed through inter-field processing is selected and when the motion information K is at the low level "0", the interpolate scanning line signal formed through the field line processing is selected. The output signal of the selector switch 95 is outputted as an interpolate scanning line signal Yi. Meanwhile, the output signal of the field memory 91 is outputted as a main scanning line signal Yr.

Turning back now to FIG. 29, the chrominance signal C outputted from the Y/C separation circuit 73 is applied to a chrominance demodulator 76. A red color difference signal R−Y and a blue color difference signal B−Y outputted from the chrominance demodulator 76 are applied to the main and interpolating signals generating circuit 75 to form a dot sequential signal R−Y/B−Y out of these color difference signals.

The main scanning line signal Yr and the interpolate scanning line signal Yi outputted from the main and interpolating signals generating circuit 75 and the dot sequential signal R−Y/B−Y of the color difference signals are applied to the fixed terminal m of the selector switch 83 as video signals for the main picture. Further, the input terminal 84 receives, for example, the NTSC color video signal SVs, which is applied to a picture-in-picture television signal processing portion 85. This picture-in-picture television signal processing portion 85 outputs a main scanning line signal yr and an interpolate scanning line signal gi of luminance signal and a dot sequential signal r−y/b−y of color difference signals. Those signals of yr, yi and r−y/b−y are applied to the fixed terminal s of the selector switch 83 as video signals for the sub-picture.

Switching of the selector switch 83 is controlled by a switching control signal SW outputted from the signal processing portion 85. That is, the selector switch 83 is put on the s side during a period when the sub-picture should be displayed, and on the m side during a period when the main picture should be displayed. In this manner, the selector switch 83 is put on the s side during a display period of the sub-picture so that the video signals for the sub-picture are inserted into those for the main picture. The output signal of the selector switch 83 is applied to a sequential scanning converting circuit 77 where a red color difference signal r−y and a blue color difference signal b−y are separated from the dot sequential signal r−y/b−y. Sequential scanning-type color difference signals R'−Y' and B'−Y' with a horizontal period of H/2 are formed by repeating the respective color difference signals twice in the same scanning period. Further, a luminance signal Y' is outputted from the dot sequential scanning converting circuit 77 and applied together with those color difference signals to a matrix circuit 78. The matrix circuit 78 outputs sequential scanning-type primary color signals of red, green and blue, or Y', G' and B', which are converted into analog signals by a D/A converter 79 before applied to a color picture tube 80.

The video signal SV received at the input terminal 71 is applied to the sync separation circuit 81 where a horizontal synchronizing signal PH and a vertical synchronizing signal PV are separated to be applied together to a deflection circuit 82. The deflection circuit 82 makes horizontal and vertical deflection control of the color picture tube 80, on which screen a non-interlace picture is displayed.

Figure 31:
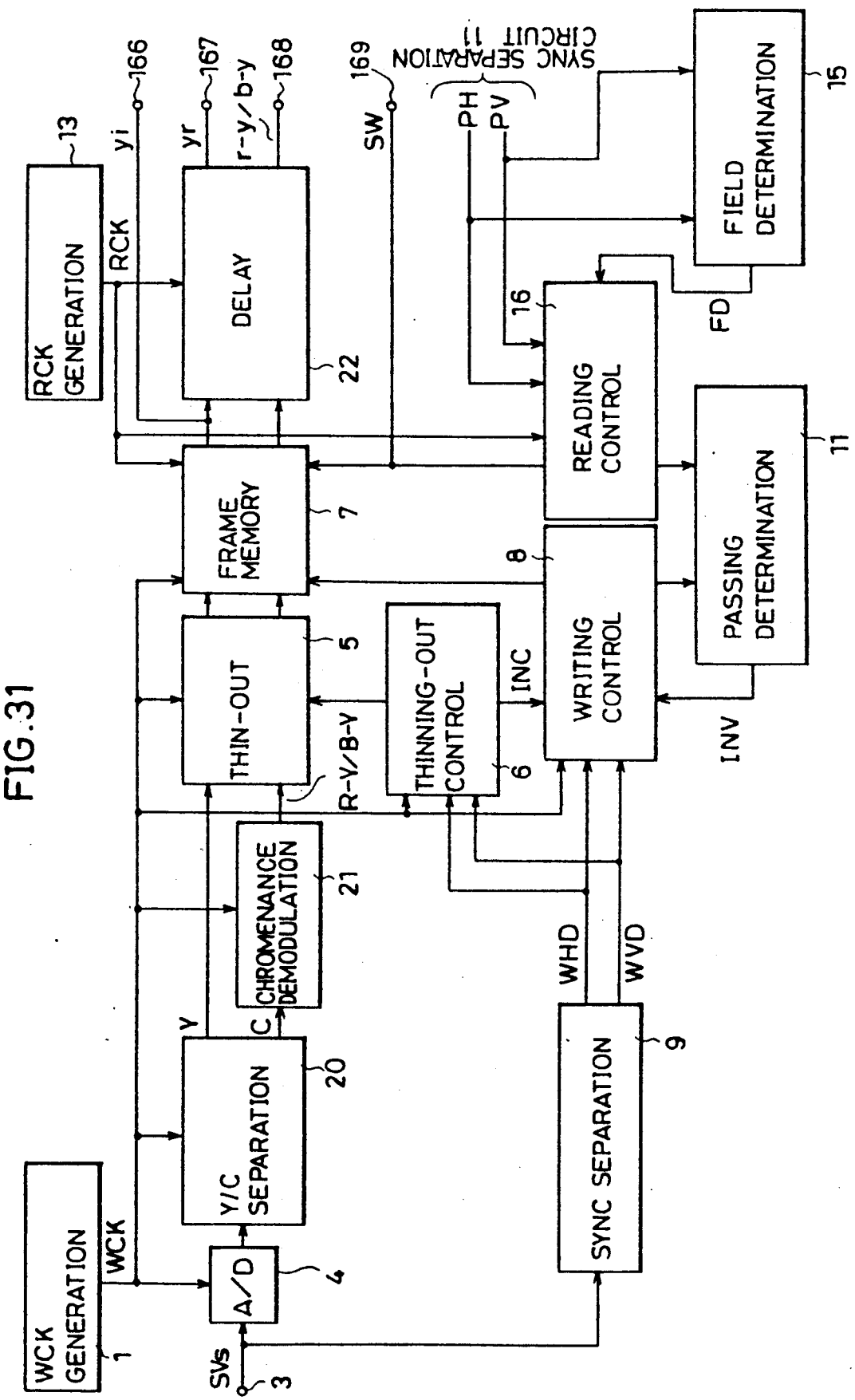
FIG. 31 is a block diagram showing an example of the picture-in-picture TV signal processing portion shown in FIG. 29.

FIG. 31 is a block diagram showing an embodiment of the picture-in-picture television signal processing portion shown in FIG. 29. The signal processing portion shown in FIG. 31 is configured in the same manner as that in FIG. 4 except the following points. That is, the video signal SVs is converted by the A/D converter 4 into a digital signal before applied to a Y/C separation circuit 20. The Y/C separation circuit 20 separates a luminance signal Y and a chrominance signal C from the video signal and applies the luminance signal Y to a thinning-out circuit 5 and the chrominance signal C to a chrominance demodulator 21. The chrominance demodulator 21 demodulates the chrominance signal C and applies a dot sequential signal R−Y/B−Y of a red color difference signal R−Y and a blue color difference signal B−Y to the thinning-out circuit 5. The thinning-out circuit is configured in the same manner as that in FIG. 18. The thinning-out circuit 5 reduces sampling rate in the vertical direction according to a display area ratio between the main picture and the sub-picture. This means that the thinning-out circuit 5 thins out the scanning lines. The output signal of the thinning-out circuit 5 is written in the frame memory 7, under control of the writing control circuit 8. The video signal for the sub-picture comprising the luminance signal yi and the dot sequential color difference signal r−y/b−y written in the frame memory 7 is applied to a delay circuit 22.

When the display area ratio of the sub-picture with respect to the main picture is 1/9, the delay circuit 22 is constituted of a delay line providing a delay time of about a ⅓ horizontal period.

The luminance signal yi read out of the frame memory 7 is applied to an output terminal 166 as an interpolate scanning line signal yi, while the luminance signal yr delayed by the delay circuit 22 is applied to another output terminal 167 as a main scanning line signal yr. The dot sequential color difference signal delayed by the delay circuit 22 is applied to an output terminal 168 as a dot sequential signal r−y/b−y.

These signals of yi, yr and r−y/b−y are applied to the fixed terminal s of the selector switch 13 shown in FIG. 29 and inserted into the video signals Yi, Yr and R−Y/B−Y for the main picture to be further applied to the dot sequential scanning converting circuit 77.

As has been described above, according to the present embodiment, a television receiver which converts a high-resolution television signal into an NTSC television signal has a picture-in-picture television signal processing circuit incorporated therein and function of a scanning line converting device is switched so that it is no longer necessary to provide two signal processing circuit of different functions and a reduction in cost can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scanning line number converting device for converting the scanning line number of a video signal, comprising:
    a low-pass filter (50) for limiting a vertical spatial frequency component of said video signal in band,
    counting means (62) for counting scanning lines of said video signal; and
    thinning-out means (5) for thinning out the scanning lines of said video signal according to a count output of said counting means.

2. The scanning line number converting device according to claim 1, wherein
    said low-pass filter comprises:
    delaying means (53v) for delaying said video signal; and
    addition means (52v) for adding said video signal and a video signal delayed by said delaying means, and
    said thinning-out means comprises switching means (51v) for executing a switch between said video signal and output of said addition means.

3. A down-converter using a scanning line number converting device which thins out the scanning lines of a first video signal, comprising:
    a frame memory (7) to and from which said first video signal with thinned-out scanning lines is written in and read out and which can control the writing and the reading asynchronously with each other;
    writing control means (6) for making control such that until a reading of one-field signals from said frame memory is accomplished, a writing is not applied to the field portion concerned, and for writing said first video signal in said frame memory in a non-interlaced state; and
    reading control means (16) for making control such that said first video signal is read out from said frame memory while undergoing an interlace conversion from the non-interlaced state such that said first video signal takes a proper interlace sequence with respect to another video signal.

4. A picture-in-picture television which displays in a predetermined position of a main picture formed of a first video signal a sub-picture formed of a second video signal having scanning lines thinned out by a down-converter, comprising:
    a frame memory (7) to and from which the second video signal having the scanning lines thinned out by said scanning line number converting device is written in and read out and which can control the writing and the reading asynchronously with each other;
    writing control means (8) for writing said second video signal in said frame memory in a non-interlaced state;
    time base compressing means (16) for reading out said second video signal written in said frame memory using a clock signal of higher speed than that for writing and compressing time base of the read-out second video signal;
    field determination means (15) for determining a field of said second video signal with respect to said first video signal;
    reading control means (16) for making control such that said second video signal is read out from said frame memory while undergoing an interlace conversion from the non-interlaced state such that according to a determination result of said field determination means, said second video signal takes a proper interlace sequence with respect to said first video signal; and
    switching means (2) for executing a switch between said first video signal and said second video signal read out of said frame memory to output.

5. A television receiver which displays a plurality of pictures formed by a picture-in-picture television, comprising:
    a sub-picture horizontal position signal generating means (173) for generating a signal indicative of a horizontal display position of the sub-picture formed of said second video signal;
    sub-picture horizontal length signal generating means (178) for generating a signal indicative of a horizontal display length of the sub-picture according to the sub-picture horizontal position signal generated from said sub-picture horizontal position signal generating means;
    sub-picture vertical position signal generating means (177) for generating a signal indicative of a vertical display position of the sub-picture formed of said second video signal;
    sub-picture vertical display height signal generating means (179) for generating a signal indicative of a vertical display height of the sub-picture according to the sub-picture vertical position signal generated from said sub-picture vertical position signal generating means; and
    switching means (2) for executing a switch between said first video signal and said second video signal read out of said frame memory according to the sub-picture horizontal length signal generated from said sub-picture horizontal length signal generating means and the sub-picture vertical display height signal generated from said sub-picture vertical display height signal generating means.

6. A down-converter using a scanning line number converting device which makes a non-interlace conversion using a main scanning line signal and an interpolate scanning line signal, comprising:

memory means (7) for storing a video signal in a non-interlaced state;

writing control means (6) for making control such that until a reading of one-field signals from said frame memory is accomplished, a writing is not applied to the field portion concerned;

delaying means (22) for providing a delay time approximately equal to a period at which a picture formed of the video signal read out of said memory means should be displayed;

determination means (15) for determining field attribute of a synchronizing signal used to read out the video signal from said memory means; and control means (16) for controlling the reading from said memory means according to the field attribute determined by said determination means and outputting an input signal and an output signal to and from said delaying means as said interpolate scanning line signal and said main scanning line signal, respectively.

7. A television which makes a display executing switches between a plurality of video signals, with the use of a scanning line number converting device which makes a non-interlace conversion using a main scanning line signal and an interpolate scanning line signal, comprising:

first main and interpolating signals generating means (75) for generating a first main scanning line signal and a first interpolate scanning line signal by processing a video signal;

second main and interpolating signals generating means (85) for generating a second main scanning line signal and a second interpolate scanning line signal by processing the other or any of the remaining plurality of video signals; and switching means (83) for selecting either said first or second main scanning line signal to apply the selected one to said scanning line number converting device as said main scanning line signal and selecting either said first or second interpolate scanning line signal to apply the selected one to said scanning line number converting device as said interpolate scanning line signal.

8. A picture-in-picture television which makes a display executing switches between a plurality of video signals, using the television receiver according to claim 7, wherein said first main and interpolating signals generating means comprises:

memory means (7) for storing any of said plurality of video signals in a non-interlaced state; and writing control means (6) for making control such that until a reading of one-field signals from said frame memory is accomplished, a writing is not applied to the field portion concerned.

* * * * *